(12) United States Patent
Mullen et al.

(10) Patent No.: US 12,014,423 B1
(45) Date of Patent: Jun. 18, 2024

(54) USING VEHICLE DATA, GEOGRAPHIC AREA TYPE DATA, AND VEHICLE COLLISION DATA IN DETERMINING AN INDICATION OF WHETHER A VEHICLE IN A VEHICLE COLLISION IS A TOTAL LOSS

(71) Applicant: STATE FARM MUTUAL AUTOMOBILE INSURANCE COMPANY, Bloomington, IL (US)

(72) Inventors: Christina P. Mullen, Normal, IL (US); Jeffrey S. Myers, Normal, IL (US); Andrew Karl Pulkstenis, Mahomet, IL (US); Stephen Russell Prevatt, Normal, IL (US); Robert T. Trefzger, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 814 days.

(21) Appl. No.: 15/628,367

(22) Filed: Jun. 20, 2017

Related U.S. Application Data

(60) Provisional application No. 62/358,979, filed on Jul. 6, 2016, provisional application No. 62/353,409, filed on Jun. 22, 2016.

(51) Int. Cl.
    *G06Q 40/02*     (2023.01)
    *G06Q 40/08*     (2012.01)
    (Continued)

(52) U.S. Cl.
    CPC ................ *G06Q 40/08* (2013.01)

(58) Field of Classification Search
    None
    See application file for complete search history.

(56) References Cited

U.S. PATENT DOCUMENTS 9,311,271 B2    4/2016    Wright
9,633,487 B2    4/2017    Wright
(Continued)

FOREIGN PATENT DOCUMENTS

EP    3239686 A1    11/2017
EP    3578433 B1    8/2020
(Continued)

OTHER PUBLICATIONS

Grover M. Edie, "Evaluating the Unearned Premium Reserve for Automobile Extended Service Contracts", Fall1999, www.casact.org (Year: 1999).*

(Continued)

*Primary Examiner* — Ryan D Donlon
*Assistant Examiner* — Irene S Kang
(74) *Attorney, Agent, or Firm* — MARSHALL, GERSTEIN & BORUN LLP

(57) ABSTRACT

A computer-implemented method of determining an indication of whether a vehicle in a crash is a total loss. The method may include (1) receiving (i) image data, (ii) sensor data, and/or (iii) telematics or other data indicative of a direction of a crash force; (2) determining a type of geographic area in which the crash occurred; (3) determining a make, a model, and/or a year of the vehicle; and (4) determining the indication of whether the vehicle is a total loss based upon (i) (a) the image data, (b) the sensor data, and/or (c) the data indicative of the direction of the crash force, (ii) the type of geographic area, and (iii) the make, the model, and/or the year of the vehicle. By determining the indication of whether the vehicle is a total loss based upon such data and/or factors, time may be saved and resources may be conserved.

20 Claims, 6 Drawing Sheets

(51) Int. Cl.
*G06F 11/00* (2006.01)
*G06Q 40/04* (2012.01)

(56) References Cited

U.S. PATENT DOCUMENTS

| | | | |
|---|---|---|---|
| 9,830,748 | B2 | 11/2017 | Rosenbaum |
| 9,990,782 | B2 | 6/2018 | Rosenbaum |
| 10,192,369 | B2 | 1/2019 | Wright |
| 10,198,879 | B2 | 2/2019 | Wright |
| 10,269,190 | B2 | 4/2019 | Rosenbaum |
| 10,467,824 | B2 | 11/2019 | Rosenbaum |
| 11,227,452 | B2 | 1/2022 | Rosenbaum |
| 11,407,410 | B2 | 8/2022 | Rosenbaum |
| 11,524,707 | B2 | 12/2022 | Rosenbaum |
| 11,594,083 | B1 | 2/2023 | Rosenbaum |
| 2013/0145482 | A1* | 6/2013 | Ricci .................... G01C 21/20 726/28 |
| 2014/0081675 | A1 | 3/2014 | Ives et al. |
| 2015/0149218 | A1* | 5/2015 | Bayley ................ B60R 21/0136 705/4 |
| 2017/0017734 | A1 | 1/2017 | Groh et al. |
| 2017/0046216 | A1 | 2/2017 | Stenneth |
| 2017/0293894 | A1 | 10/2017 | Taliwal et al. |
| 2022/0092893 | A1 | 3/2022 | Rosenbaum |
| 2022/0340148 | A1 | 10/2022 | Rosenbaum |
| 2023/0060300 | A1 | 3/2023 | Rosenbaum |

FOREIGN PATENT DOCUMENTS

| | | |
|---|---|---|
| EP | 3730375 B1 | 10/2021 |
| EP | 3960576 A1 | 3/2022 |
| EP | 4190659 A1 | 6/2023 |
| EP | 4190660 A1 | 6/2023 |

OTHER PUBLICATIONS

Ben Dickson, What is Machine Learning?, PC Magazine, downloaded from the Internet at: <www.pcmag.com> (Jul. 8, 2019).

* cited by examiner

USING VEHICLE DATA, GEOGRAPHIC AREA TYPE DATA, AND VEHICLE COLLISION DATA IN DETERMINING AN INDICATION OF WHETHER A VEHICLE IN A VEHICLE COLLISION IS A TOTAL LOSS

CROSS REFERENCE TO RELATED APPLICATIONS

This application claims the benefit of (1) U.S. Provisional Patent Application No. 62/353,409, entitled "Determining an Indication of Whether a Vehicle in a Crash is a Total Loss," filed Jun. 22, 2016, and (2) U.S. Provisional Patent Application No. 62/358,979, entitled "Determining an Indication of Whether a Vehicle in a Vehicle Collision is a Total Loss," filed Jul. 6, 2016. Each of U.S. Provisional Patent Application Nos. 62/353,409 and 62/358,979 is hereby expressly incorporated by reference herein in its entirety.

FIELD OF THE DISCLOSURE

The present disclosure generally relates to determining total loss of a vehicle and, more particularly, to systems and methods for predicting whether a vehicle is a total loss.

BACKGROUND

An insurance provider may determine whether a vehicle that has been in a crash (collision) is a "total loss." Typically, an agent or other representative of the insurance provider assesses a vehicle after the vehicle has been damaged in a collision. The agent may determine whether the vehicle should be declared a total loss. This determination requires time and monetary expenditures by the insurance company (e.g., for the agent to assess the vehicle), and frequently requires time and monetary expenditures associated with storing the vehicle (e.g., while awaiting agent assessment, while awaiting transport to a location where the agent is to assess the vehicle, etc.). In some cases, the vehicle may be stored and/or transported to a location only to be determined upon agent assessment to be a total loss, thereby rendering at least some of the expenditures associated with storing and/or transporting the vehicle wasteful.

BRIEF SUMMARY

This Brief Summary is provided to introduce a selection of concepts in a simplified form that are further described below in the Detailed Description. This Brief Summary is not intended to identify key features or essential features of the claimed subject matter, nor is it intended to be used to limit the scope of the claimed subject matter.

Total loss of a vehicle that has been in a crash (also referred to herein as a "vehicle collision" or "collision") may be predicted by determining, without the need for assessment or inspection by an agent or other representative of an insurance provider, an indication of whether the vehicle is a total loss. The determination of the indication of whether the vehicle is a total loss may be based upon vehicle data, vehicle collision data, and geographic area type data. More particularly, the determination of the indication of whether the vehicle is a total loss may be based upon (i) vehicle collision data including at least one of (a) image data associated with the crash ("collision" or "vehicle collision"), (b) sensor data and/or telematics data associated with the crash, or (c) data indicative of a direction of a crash force exerted upon the vehicle during the crash; (ii) geographic area type data (e.g., the type of geographic area in which the crash occurred); and (iii) vehicle data including at least one of (a) a make of the vehicle, (b) a model of the vehicle, or (c) a year of the vehicle. It should be appreciated from the teaching and disclosure herein that sensor data and telematics data are at times collectively referred to herein as "sensor data" or "telematics data" for ease of explanation, although sensor data such as that described herein may include data that is not telematics data, and telematics data such as that described herein may include data that is not sensor data.

The image data may be received from a computing device(s) such as a mobile computing device and/or on-board computing device within the vehicle; a mobile computing device outside of the vehicle (e.g., a mobile device of an observer of the crash); and/or an image capturing device(s) such as an image capturing device(s) of, within, or deployed from an infrastructure component (e.g., a traffic light) or emergency response system (EMS) vehicle. The sensor data may be received from one or more sensors of the vehicle, such as an accelerometer. The make, model, and/or year of the vehicle may be determined based upon the image data, data stored by the insurance provider, etc. The type of geographic area in which the crash occurred may be determined based upon suitable sensor data, such as suitable Global Positioning System (GPS) receiver data.

In one aspect, a computer-implemented method of determining an indication of whether a vehicle in a vehicle collision is a total loss, and/or for improving the functioning of a computer, may be provided. The method may include: (1) receiving (such as via wireless communication or data transmission over one or more radio frequency links or wireless communication channels), by one or more processors, at least one of (i) image data representing at least one image of an exterior of the vehicle, the vehicle having been in the vehicle collision, the image data being image data captured after the vehicle collision, (ii) sensor data associated with the vehicle collision, the sensor data including acceleration data associated with the vehicle collision, or (iii) data indicative of a direction of a crash force exerted upon the vehicle during the vehicle collision; (2) determining, by the one or more processors, a type of geographic area in which the vehicle collision occurred; (3) determining, by the one or more processors, at least one of (i) a make of the vehicle, (ii) a model of the vehicle, or (iii) a year of the vehicle; and/or (4) determining, by the one or more processors, the indication of whether the vehicle is a total loss as a result of the vehicle collision based upon (i) the at least one of (a) the image data, (b) the sensor data associated with the vehicle collision, or (c) the data indicative of the direction of the crash force exerted upon the vehicle during the vehicle collision, (ii) the type of geographic area in which the vehicle collision occurred, and (iii) the at least one of (a) the make of the vehicle, (b) the model of the vehicle, or (c) the year of the vehicle. The method may include additional, fewer, or alternate actions, including those discussed elsewhere herein.

In another aspect, a computer system configured to determine an indication of whether a vehicle in a vehicle collision is a total loss may be provided. The computer system may include at least one of (i) one or more processors, (ii) one or more transceivers, (iii) one or more servers, or (iv) one or more sensors. The computer system may be configured to: (1) receive (such as via wireless communication or data transmission over one or more radio frequency links or wireless communication channels) at least one of (i) image data representing at least one image of an exterior of the vehicle, the vehicle having been in the vehicle collision, the image data being image data captured after the vehicle collision, (ii) sensor data associated with the vehicle collision, the sensor data including acceleration data associated with the vehicle collision, or (iii) data indicative of a direction of a crash force exerted upon the vehicle during the vehicle collision; (2) determine a type of geographic area in which the vehicle collision occurred; (3) determine at least one of (i) a make of the vehicle, (ii) a model of the vehicle, or (iii) a year of the vehicle; and/or (4) determine the indication of whether the vehicle is a total loss as a result of the vehicle collision based upon (i) the at least one of (a) the image data, (b) the sensor data associated with the vehicle collision, or (c) the data indicative of the direction of the crash force exerted upon the vehicle during the vehicle collision, (ii) the type of geographic area in which the vehicle collision occurred, and (iii) the at least one of (a) the make of the vehicle, (b) the model of the vehicle, or (c) the year of the vehicle. The computer system may be configured to perform additional, fewer, or alternate actions, including those discussed elsewhere herein.

In yet another aspect, a system of determining an indication of whether a vehicle in a vehicle collision is a total loss may be provided. The system may include one or more insurance provider computing devices associated with an insurance provider. The one or more insurance provider computing devices may be configured to: (1) receive at least one of (i) image data representing at least one image of an exterior of the vehicle, the vehicle having been in the vehicle collision, the image data being image data captured after the vehicle collision, (ii) sensor data associated with the vehicle collision, the sensor data including acceleration data associated with the vehicle collision, or (iii) data indicative of a direction of a crash force exerted upon the vehicle during the vehicle collision; (2) determine a type of geographic area in which the vehicle collision occurred; (3) determine at least one of (i) a make of the vehicle, (ii) a model of the vehicle, or (iii) a year of the vehicle; and/or (4) determine the indication of whether the vehicle is a total loss as a result of the vehicle collision based upon (i) the at least one of (a) the image data, (b) the sensor data associated with the vehicle collision, or (c) the data indicative of the direction of the crash force exerted upon the vehicle during the vehicle collision, (ii) the type of geographic area in which the vehicle collision occurred, and (iii) the at least one of (a) the make of the vehicle, (b) the model of the vehicle, or (c) the year of the vehicle. The one or more insurance provider computing devices may be configured to perform additional, fewer, or alternate actions, including those discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the system and methods disclosed herein. It should be understood that each Figure depicts an embodiment of a particular aspect of the disclosed system and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and instrumentalities shown, wherein.

Figure 1:
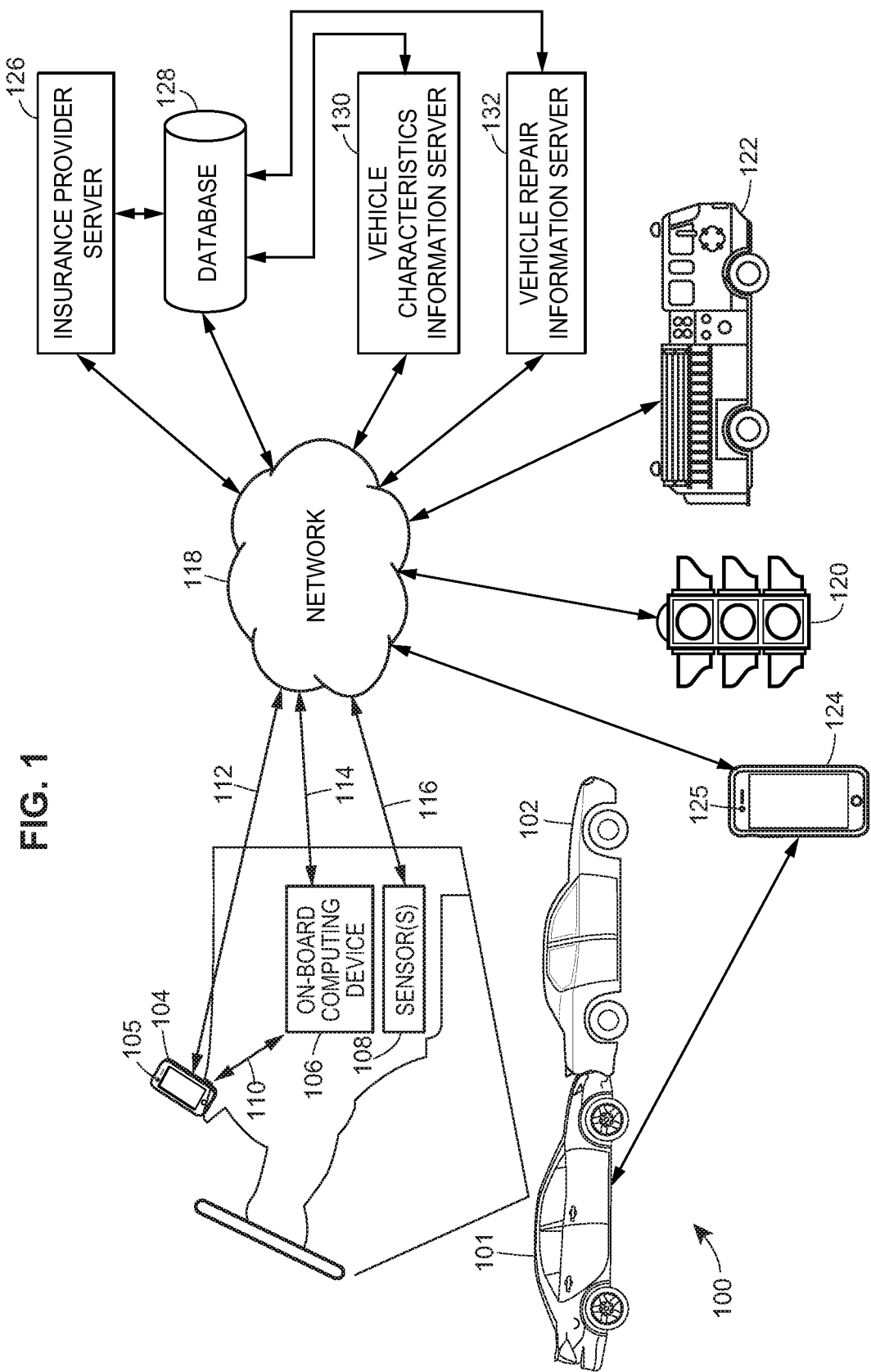
FIG. 1 illustrates a block diagram of an exemplary vehicle total loss determination system 100 in accordance with an exemplary aspect of the present disclosure.

The Figures depict preferred embodiments for purposes of illustration only. Alternative embodiments of the systems and methods illustrated herein may be employed without departing from the principles of the invention described herein.

DETAILED DESCRIPTION

The present embodiments relate to, inter alia, predicting total loss of a vehicle in a vehicle collision without the need for an insurance agent or other representative to inspect or assess damage to the vehicle. For instance, an indication of whether the vehicle is a total loss as a result of the crash (also referred to herein as a "vehicle collision" or "collision," as noted above) may be determined based upon vehicle data, vehicle collision data, and geographic area type data. More particularly, the indication of whether the vehicle is a total loss as a result of the crash may be determined based upon (i) vehicle collision data including (a) image data representing at least one image of an exterior of the vehicle after the vehicle has been in the crash, (b) sensor data associated with the crash, such as but not limited to acceleration data from one or more accelerometers of the vehicle, and/or (c) data indicative of a direction of a crash force exerted upon the vehicle during the crash (e.g., a direction of a force exerted upon the vehicle resulting from the impact of another vehicle upon the vehicle); (ii) geographic area type data (e.g., a determined type of geographic area in which the crash occurred, where the type of geographic area may be determined at least in part by use of a Global Positioning System (GPS) receiver, such as a GPS receiver in the vehicle); and (iii) vehicle data including (a) a make of the vehicle, (b) a model of the vehicle, and/or (c) a year of the vehicle. The determination of the indication of whether the vehicle is a total loss may be performed using one or more processors, such as one or more processors of an insurance provider server of an insurance provider that provides insurance coverage with respect to the vehicle. The make, model, and/or year of the vehicle may be determined from the image data or from stored data regarding the vehicle, such as data stored by the insurance provider when the insurance provider issues the insurance coverage with respect to the vehicle.

In some aspects, the determination of whether the vehicle is a total loss may include determinations of whether one or more of the aforementioned factors (e.g., type of geographic area; vehicle make, model, and year; image data, etc.) is similar to values, types, etc. of such factors that have been previously determined to correspond to a vehicle being a total loss. For example, an indication of a similarity of the vehicle make, model, and/or year to make(s), model(s), and/or year(s) previously determined to correspond to or be indicative of a total loss; an indication of a similarity of the image data to image data previously determined to correspond to or be indicative of a total loss, etc., may be determined. Generally speaking, any suitable technique for determining whether the vehicle is a total loss based upon factors such as those mentioned above, such as a machine learning technique(s), may be employed.

In some aspects, at least one characteristic of a frame of the vehicle (e.g., a type of the frame of the vehicle) may be determined, such as based upon the image data and/or based upon stored information from another source (e.g., the vehicle manufacturer, with such information being stored at, for instance, an insurance provider server). For instance, the at least one characteristic of the frame of the vehicle may be initially determined based upon the image data and may be confirmed, at least in part, by the stored information. The indication of whether the vehicle is a total loss may be determined further based upon the at least one characteristic of the frame of the vehicle. More particularly, in some aspects, data regarding vehicle crashes (e.g., claims data of an insurance provider from previous vehicle crashes) may be used to determine that the at least one characteristic of the frame of the vehicle corresponds to an increased or decreased likelihood that the vehicle is a total loss as a result of the crash.

It should be appreciated from the teaching and disclosure herein that the determination of the indication of whether the vehicle is a total loss may be a prediction or initial determination of whether the vehicle is a total loss (e.g., a prediction or initial determination based upon factors such as those discussed herein). Thus, among other advantages, an insurance agent or other representative(s)/agent(s) of the insurance provider that provides the insurance coverage with respect to the vehicle need not, at least in some situations, physically inspect or otherwise assess or coordinate an assessment of the damaged vehicle. The vehicle may instead be determined to be a total loss in the manner described herein and in the absence of any such inspection or assessment, and in some aspects a determination of whether one or more components of the vehicle are to be salvaged may also be performed without dispatching an insurance agent or representative. Such determinations may, if desired, be confirmed by visual inspection (e.g., after a vehicle is brought to a salvage yard, and/or at other suitable time(s)).

In some aspects, the aforementioned determination of whether one or more components of the vehicle (e.g., electronics, sensors, tires, an engine, a battery, a tail light, a seat, brakes, transmissions, clutches, drive trains, and/or any other component(s) of a vehicle) are to be salvaged may be performed based upon the image data, the type of the geographic area in which the crash occurred, the sensor data associated with the crash, the data indicative of the direction of the crash force exerted upon the vehicle during the crash, the make of the vehicle, the model of the vehicle, and/or the year of the vehicle. For instance, the image data and the make, model, and/or year of the vehicle may indicate whether at least a portion of an engine and/or other relatively high-value component(s) of the vehicle is likely to be salvageable after the crash. Depending upon a component(s) indicated as likely to be salvageable, the associated value(s) of such component(s), and a cost associated with salvaging the component(s), the aforementioned determination of whether one or more components of the vehicle are to be salvaged may be performed. In other aspects, any suitable additional or alternative factors may be used to determine (e.g., without the need for an insurance agent to assess the damaged vehicle) whether any one or more components of the vehicle are to be salvaged or otherwise recovered and sold, for example.

In some aspects, based upon the determined type of the geographic area in which the crash occurred, an indication of an amount of expense associated with repairing the vehicle in the geographic area after the crash may be determined. For instance, the indication of the amount of expense associated with repairing the vehicle may depend upon the complexity of repair required, and may also depend upon the determined type of the geographic area because of different cost(s) of parts and/or labor in different types of geographic areas (e.g., rural areas, suburban areas, urban areas, etc.). Determining the indication of whether the vehicle is a total loss may be further based upon the indication of the amount of expense associated with repairing the vehicle in the geographic area after the crash. In some aspects, determining the indication of the amount of expense associated with repairing the vehicle in the geographic area after the crash may be further based upon the aforementioned data regarding vehicle crashes (e.g., claims data of an insurance provider from previous vehicle crashes).

In some aspects, receiving the data indicative of the direction of the crash force exerted upon the vehicle may include receiving (i) the image data; (ii) the sensor data associated with the crash; (iii) an indication of a Delta-V associated with the crash; (iv) a characteristic(s) of the vehicle, such as a make, model, year, and/or frame characteristic(s) of the vehicle; (v) whether the crash occurred on private property; (vi) an area of the vehicle impacted during the crash; (vii) an indication of an amount of crush experienced by another vehicle involved in the crash with the vehicle; and/or (viii) additional sensor data from the other vehicle involved in the crash with the vehicle. For instance, receiving the data indicative of the direction of the crash force exerted upon the vehicle may include receiving one or more of the aforementioned data/factors when a Supplemental Restraint System (SRS) module (which may also be referred to as an airbag electronic control unit (ECU)) is inoperative, or when crash data indicative of the direction of the crash force exerted upon the vehicle otherwise cannot be retrieved from the SRS module without an insurance agent or other representative physically assessing the vehicle. Some of the aforementioned data/factors such as, for instance, the area of the vehicle impacted during the crash, may in some aspects be determined based upon the image data. An indication of the direction of the crash force exerted upon the vehicle may be determined (e.g., by one or more processors of the insurance provider server) based upon the data indicative of the direction of the crash force, and the determined indication of the direction of the crash force may be used in determining the indication of whether the vehicle is a total loss. In aspects where receiving the data indicative of the direction of the crash force exerted upon the vehicle includes receiving the sensor data associated with the crash and/or the additional sensor data from the other vehicle (among other possible received data, such as the examples described above), the sensor data and the additional sensor data may in some aspects each include acceleration data (e.g., from accelerometers of the vehicle and the other vehicle).

Exemplary Prediction of Total Loss of a Vehicle in a Crash

The systems and methods disclosed herein relate generally to predicting whether a vehicle involved in a crash ("vehicle collision" or "collision") is a total loss (e.g., determining an indication of whether the vehicle is a total loss) without, for instance, the need for an insurance agent or other representative to inspect and/or assess the vehicle. More particularly, the systems and methods advantageously avoid the need for an insurance agent or other representative of an insurance provider to inspect and/or assess the vehicle by determining an indication of whether a vehicle is a total loss as a result of the crash based upon (i) at least one of (a) the aforementioned image data representing at least one image of an exterior of the vehicle after the vehicle has been in the crash, (b) the aforementioned sensor data associated with the crash, or (c) the data indicative of the direction of the crash force exerted upon the vehicle during the crash; (ii) the type of geographic area in which the crash occurred; and (iii) at least one of (a) the make of the vehicle, (b) the model of the vehicle, or (c) the year of the vehicle.

Accordingly, the systems and methods determine an indication of whether a vehicle is a total loss based upon information that allows such an indication to be a generally accurate prediction of whether the vehicle is a total loss, thereby avoiding the need for an insurance agent to physically or remotely (such as via a remote computing device) inspect and/or assess the vehicle. The determination of the indication of whether the vehicle is a total loss may be made, for instance, by one or more processors of an insurance provider server or other suitable computing device.

Accordingly, the present embodiments may improve the technological field of, for instance, computerized determination of whether a vehicle is a total loss (or an indication of whether a vehicle is a total loss) by using solutions or improvements in another technological field. For instance, with reference to the foregoing discussion and the discussion below, the present embodiments may use solutions or improvements associated with image data captured after a vehicle crash; sensor and/or telematics data associated with the vehicle crash; stored and/or captured (e.g., photographed) information regarding the vehicle such as a make, model, and/or year, etc., to allow the determination of an indication of whether the vehicle is a total loss without the need for an inspection, assessment, etc. of the vehicle. As such, the present embodiments may improve the nature of systems and methods for determining an indication of whether the vehicle is a total loss by using such data and/or based upon such factors, as discussed herein. Consequently, it will be understood from the teaching and disclosure herein that the systems and methods described and claimed herein are directed to an improvement to computer functionality, and improve the functioning of conventional computers. Other advantages will be recognized by one of ordinary skill in the art in light of the teaching and disclosure herein.

Exemplary System for Determining Indication of Whether Vehicle is a Total Loss

FIG. 1 illustrates a block diagram of an exemplary vehicle total loss determination system 100 in accordance with an exemplary aspect of the present disclosure. In some aspects, vehicle total loss determination system 100 may include hardware and software entities, applications, components, and devices configured to determine an indication of whether a vehicle is a total loss. It should be appreciated that additional, fewer, or alternate entities, applications, components, and devices may be implemented.

In one aspect, as shown in FIG. 1, vehicle total loss determination system 100 may include a first vehicle 101 and a second vehicle 102. Each of first vehicle 101 and second vehicle 102 may be any suitable type of vehicle, such as but not limited to a sedan, a motorcycle, a van, a truck, etc. In the example of FIG. 1, first vehicle 101 is illustrated as a sedan and second vehicle 102 is illustrated as a sedan. First vehicle 101 and second vehicle 102 may have been in a crash, which in the example of FIG. 1 is illustrated as a crash in which a front of first vehicle 101 has collided with a rear of second vehicle 102.

FIG. 1 also illustrates example components of first vehicle 101. In some aspects, second vehicle 102 may include at least some of the same or similar components. More particularly, as shown in FIG. 1, first vehicle 101 may include a first mobile computing device 104 and/or an on-board computing device 106. First mobile computing device 104 may be any suitable type of mobile computing device, such as a smartphone, a tablet, a phablet, smart glasses, other wearable computing device(s) or mobile devices, etc., and may perform actions further described herein, including in some aspects by way of a first image capturing device (e.g., first camera) 105 included in first mobile computing device 104. On-board computing device 106 may be capable of performing all of the functions of first mobile computing device 104, and first mobile computing device 104 may be capable of performing all of the functions of on-board computing device 106. On-board computing device 106 may be permanently or removably attached to first vehicle 101. On-board computing device 106 and/or first mobile computing device 104 may interface with one or more sensors 108 in first vehicle 101 (e.g., a speedometer, an accelerometer(s), a compass, a Global Positioning System (GPS) receiver, a throttle position sensor, an airbag deployment trigger sensor, etc.), and/or may interface with one or more external output devices in first vehicle 101 (e.g., a speaker(s), a display(s), etc. (not shown in FIG. 1)).

In various aspects, first mobile computing device 104 and/or on-board computing device 106 may be configured with suitable hardware and/or software (e.g., one or more applications, programs, files, etc.) to monitor, measure, generate, and/or collect telematics data associated with first vehicle 101. For instance, the telematics data associated with first vehicle 101 may include braking data, speed data, acceleration data, turn data (e.g., left turn and/or right turn data, such as indications of a left turn(s) and/or a right turn(s)), and/or direction data (e.g., heading or compass data) associated with first vehicle 101. As such, it will be appreciated that in some aspects, at least some of the telematics data associated with first vehicle 101 may include data that is the same as or similar to at least some of the sensor data associated with first vehicle 101 that may be monitored, measured, generated, and/or collected by sensor(s) 108. In some aspects, on-board computing device 106 may supplement one or more functions performed by first mobile computing device 104 (or vice versa) by, for example, sending data to and/or receiving data from first mobile computing device 104.

In one aspect, first mobile computing device 104 and/or on-board computing device 106 may operate independently of one another to generate and/or receive sensor data (e.g., from sensor(s) 108) and/or telematics data. In another aspect, first mobile computing device 104 and/or on-board computing device 106 may operate in conjunction with one another to generate and/or receive sensor data and/or telematics data. First mobile computing device 104 and on-board computing device 106 may share any suitable portion of processing between one another to facilitate the functionality described herein.

First mobile computing device 104 and on-board computing device 106 may communicate with one another directly over a wired or wireless link 110. In addition, first mobile computing device 104, on-board computing device 106, and sensor(s) 108 may communicate over wired or wireless links 112, 114, and 116, respectively, with a network 118. First mobile computing device 104 and/or on-board computing device 106 may be configured to broadcast or otherwise transmit sensor data (e.g., from sensor(s) 108) and/or telematics data (such as, but not limited to, the example types of sensor data and telematics data described herein) to one or more external components over, for example, link 112 and/or link 114 and network 118. In some aspects, as further discussed below, sensor data sent via network 118 (which may be sensor data of the first set of sensor data and/or the second set of sensor data) may further include image data, such as image data representing images of an exterior of first vehicle 101 (e.g., included in the first set of sensor data and/or the second set of sensor data) and/or images of an exterior of second vehicle 102 (e.g., included in the first set of sensor data and/or the second set of sensor data). The sensor data sent via network 118 may include such image data representing images of an exterior(s) of first vehicle 101 and/or second vehicle 102 before, during, and/or after the vehicle collision, and such image data may be obtained from any suitable source such as, for instance, a second mobile computing device(s) outside of first vehicle 101 and/or outside of second vehicle 102. First mobile computing device 104 and/or on-board computing device 106 may be used (e.g., operated) by a party associated with first vehicle 101 (e.g., an owner and/or driver of first vehicle 101). The party associated with first vehicle 101 may have insurance coverage with respect to first vehicle 101 as issued by an insurance provider.

Network 118 may include any suitable number of interconnected network components that form an aggregate network system. Network 118 may be or may include at least a portion of a network such as the Internet and/or any other type of suitable network (e.g., a Bluetooth network, a local area network (LAN), a metropolitan area network (MAN), a wide area network (WAN), a mobile network, a wired or wireless network, a private network, a virtual private network, etc.). Network 118 may also or alternatively be or include, for instance, one or more cellular networks such as a code division multiple access (CDMA) network, a GSM (Global System for Mobile Communications) network, a WiMAX (Worldwide Interoperability for Microwave Access) network, a Long Term Evolution (LTE) network, etc.

In some aspects, vehicle total loss determination system 100 may also include an infrastructure component 120 and/or an emergency response system (EMS) vehicle 122. It should be appreciated that infrastructure component 120 may be any suitable infrastructure component, including a "smart" infrastructure component that may be configured with, for instance, functionality to collect, transmit, etc. data such as image data representing at least one image of an exterior of first vehicle 101. For instance, infrastructure component 120 may be a smart traffic light as shown in the example of FIG. 1, or may be a smart street sign or road post, a smart toll booth, a smart railroad crossing, etc. EMS vehicle 122 may be any suitable EMS vehicle, such as, for instance, a fire truck as illustrated in the example of FIG. 1, or an ambulance, police vehicle, etc.

Additionally or alternatively, in some aspects, vehicle total loss determination system 100 may include a second mobile computing device 124, which may also be any suitable mobile computing device such as one of the example types of mobile computing devices described above. Second mobile computing device 124 may include a second image capturing device (e.g., second camera) 125. Vehicle total loss determination system 100 may also include an insurance provider server 126, a database 128, a vehicle characteristics information server 130, and a vehicle repair information server 132. In one aspect, in addition to each of mobile computing device 104, on-board computing device 106, and sensor(s) 108 being coupled to network 118 as described above, each of infrastructure component 120, EMS vehicle 122, second mobile computing device 124, insurance provider server 126, database 128, vehicle characteristics information server 130, and vehicle repair information server 132 may be coupled to network 118 via suitable wired and/or wireless links, as shown in FIG. 1. Additionally or alternatively, in one aspect, each of insurance provider server 126, vehicle characteristics information server 130, and vehicle repair information server 132 may be coupled to database 128, as shown in FIG. 1.

First mobile computing device 104 and/or on-board computing device 106 may allow, for example, the party associated with first vehicle 101 (e.g., owner and/or driver) to receive one or more notifications from, for instance, the insurance provider (e.g., from insurance provider server 126) of whether an indication that first vehicle 101 is a total loss has been determined. In some aspects, first mobile computing device 104 may be used to determine a type of geographic area in which the crash occurred, such as by way of a GPS receiver included in or associated with first mobile computing device 104 (e.g., a GPS receiver included in sensor(s) 108). Additionally or alternatively, in some aspects, first mobile computing device 104, and more particularly first image capturing device 105, may also be used to capture at least some of the image data representing at least one image of the exterior of first vehicle 101 after first vehicle 101 has been in the crash (e.g., a crash with second vehicle 102). Additionally or alternatively, in some aspects, on-board computing device 106 and/or first mobile computing device 104 may receive sensor data associated with the crash from sensor(s) 108 and may, for instance, send such sensor data to insurance provider server 126. The aforementioned and other exemplary functionality of first mobile computing device 104, on-board computing device 106, and/or sensor(s) 108 within vehicle total loss determination system 100 is further described below.

In some aspects, infrastructure component 120 and/or EMS vehicle 122 may be used in capturing the image data representing at least one image of the exterior of first vehicle 101 after first vehicle 101 has been in the crash. For instance, infrastructure component 120 may be a traffic light or smart traffic light positioned geographically close to a site of the crash, and an image capturing device (not shown), which may be a camera or any other suitable image capturing device, may be mounted on infrastructure component 120. Additionally or alternatively, EMS vehicle 122 may have been located at or geographically close to the site of the crash before the crash, or may arrive geographically close to or at the site of the crash after the crash, and an image capturing device (not shown) may be used or deployed by and/or from EMS vehicle 122. For instance, EMS vehicle 122 may be a police vehicle responding to the crash and a camera or other image capturing device (or devices) within the police vehicle may capture the image data representing at least one image of the exterior of first vehicle 101. In another example, an image capturing device may be deployed by and/or from EMS vehicle 122, such as a suitable image capturing device that is part of an unmanned aircraft system (UAS) deployed by and/or from EMS vehicle 122.

It should be appreciated that in some aspects, one of infrastructure component 120 or EMS vehicle 122 may be included in vehicle total loss determination system 100 to capture the image data or facilitate the capturing of the image data. In other aspects, each of infrastructure component 120 and EMS vehicle 122 may be included in vehicle total loss determination system 100, and each of infrastructure component 120 and EMS vehicle 122 may capture or facilitate the capture of a portion of the image data. In still other aspects, neither of infrastructure component 120 nor EMS vehicle 122 may be included in vehicle total loss determination system 100, and the image data may be captured by, for instance, first mobile computing device 104, on-board computing device 106, and/or second mobile computing device 124, as further described herein.

As noted above, in some aspects, second mobile computing device 124, and more particularly second image capturing device 125, may be used to capture at least some of the image data representing at least one image of the exterior of first vehicle 101 after first vehicle 101 has been in the crash. For instance, second mobile computing device 124 may be a mobile computing device of a party other than the party associated with first vehicle 101 (e.g., may be a mobile computing device of a bystander or other observer who witnesses the crash or observes the site of the crash after the crash, etc.). In some aspects, the party other than the party associated with first vehicle 101 need not have insurance coverage issued by the insurance provider and/or need not have any association with the insurance provider, but may be able to send image data captured using second mobile computing device 124 and second image capturing device 125 to, for instance, insurance provider server 126 (e.g., by accessing, via network 118, a website hosted by insurance provider server 126).

In some aspects, insurance provider server 126 may receive (e.g., by one or more processors thereof) the image data representing at least one image of an exterior of first vehicle 101, sensor data associated with the crash such as sensor data from sensor(s) 108, and/or data indicative of a direction of a crash force exerted upon first vehicle 101 during the crash, as further described below. For instance, insurance provider server 126 may receive such data and/or any other suitable data via network 118. In some aspects, insurance provider server 126 may additionally or alternatively determine a type of geographic area in which the crash occurred, and/or at least one of a make, model, or year of first vehicle 101. In some aspects, insurance provider server 126 may then determine the indication of whether first vehicle 101 is a total loss, such as in the manner described above and discussed more fully herein.

With reference to the discussion above, and as further discussed herein, in some aspects, insurance provider server 126 may determine, based upon the determined type of the geographic area in which the crash occurred, an indication of an amount of expense associated with repairing first vehicle 101 in the geographic area after the crash. In one aspect, insurance provider server 126 may determine the indication of the amount of expense associated with repairing first vehicle 101 based upon information from (e.g., stored by) vehicle repair information server 132. For instance, such information stored by vehicle repair information server 132 may include information regarding whether vehicle parts and/or labor are more or less expensive (and in some aspects, particular information indicating how much more or less expensive) in the geographic area as compared to, for example, other geographic areas, a mean cost(s), a median cost(s), etc. Such information may additionally or alternatively, in other aspects, be stored by one or more of insurance provider server 126 or database 128.

With further reference to the discussion above, the insurance provider server 126 may determine the make, model, and/or year of vehicle 101 based upon, for instance, the image data representing the at least one image of the exterior of vehicle 101, and/or based upon, for instance, stored data indicative of the make, model, and/or year of vehicle 101. For instance, in various aspects, when the insurance provider issues insurance coverage with respect to vehicle 101, the insurance provider may store such data indicative of the make, model, and/or year of vehicle 101 at insurance provider server 126, database 128, and/or vehicle characteristics information server 130.

Database 128 may be or may include, for instance, one or more hard disk drives, optical storage drives, solid state storage devices, etc. Vehicle characteristics information server 130 may be, for instance, a server operated and/or made accessible by the insurance provider or by a third party that collects or aggregates vehicle information such as make, model, and year, such as based upon a vehicle identification number (VIN). Vehicle repair information server 132 may be, for instance, a server operated and/or made accessible by the insurance provider or by a third party or parties (which may be a third party or parties different from a third party that operates and/or makes accessible vehicle characteristics information server 130). For example, vehicle repair information server may be operated and/or made accessible by a third party (or parties) that collects, aggregates, or contributes vehicle repair information, such as information regarding cost(s) of parts and/or labor contributed by repair shops, collected from customers of repair shops and/or from the insurance provider and/or other insurance providers, etc. The aforementioned and other exemplary functionality of components such as second mobile computing device 124, second image capturing device 125, insurance provider server 126, database 128, vehicle characteristics information server 130, and vehicle repair information server 132 within vehicle total loss determination system 100 is further described below.

Although vehicle total loss determination system 100 is shown in FIG. 1 as including one instance of various components such as first vehicle 101, second vehicle 102, insurance provider server 126, vehicle characteristics information server 130, vehicle repair information server 132, etc., various aspects include vehicle total loss determination system 100 implementing any suitable number of any of the components shown in FIG. 1 and/or omitting any suitable ones of the components shown in FIG. 1. For instance, information described as being stored at vehicle characteristics information server 130 and/or vehicle repair information server 132 may in some aspects be stored at insurance provider server 126 or database 128, and thus vehicle characteristics information server 130 and/or vehicle repair information server 132 may be omitted. Moreover, various aspects include vehicle total loss determination system 100 including any suitable additional component(s) not shown in FIG. 1, such as but not limited to example components described above. Furthermore, it should be appreciated that additional and/or alternative connections between components shown in FIG. 1 may be implemented. As just one example, insurance provider server 126 and vehicle characteristics information server 130 may be connected via a direct communication link (not shown in FIG. 1) instead of or in addition to via network 118.

Exemplary Determining of Indication of Whether Vehicle is Total Loss

Figure 2:
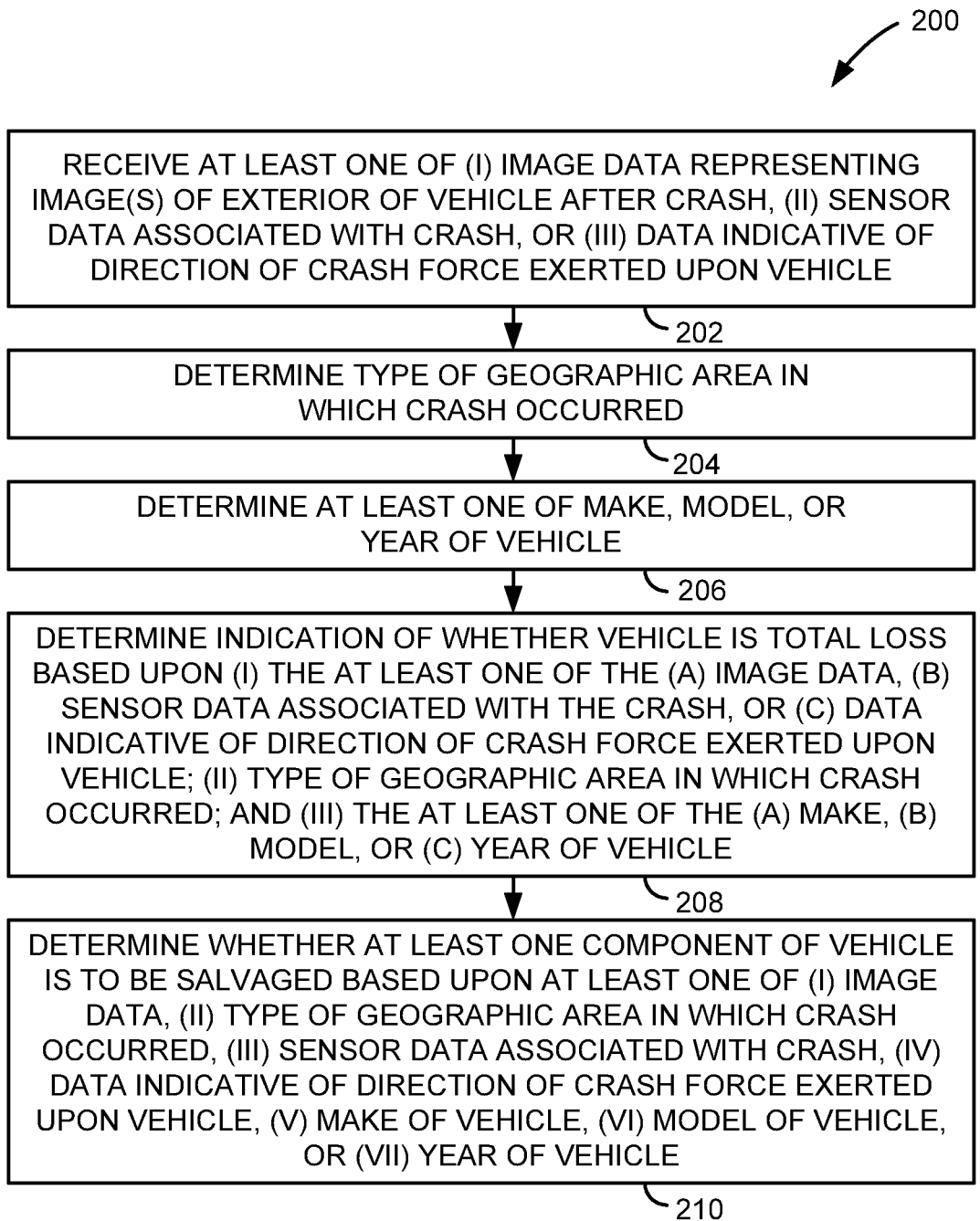
FIG. 2 illustrates an exemplary computer-implemented method 200 of determining an indication of whether a vehicle is a total loss in accordance with an exemplary aspect of the present disclosure.

FIG. 2 illustrates an exemplary computer-implemented method 200 of determining an indication of whether a vehicle is a total loss (e.g., of predicting total loss of a vehicle in a crash). In one aspect, the method 200 may be implemented by insurance provider server 126. For instance, the method 200 may be performed by one or more processors, applications, and/or routines that are part of, stored by, and/or otherwise accessible to insurance provider server 126.

The method 200 may include receiving (i) image data representing at least one image of an exterior of a vehicle (e.g., first vehicle 101), where the vehicle (e.g., first vehicle 101) has been in a crash (e.g., a crash with second vehicle 102, as illustrated in FIG. 1); (ii) sensor data associated with the crash; and/or (iii) data indicative of a direction of a crash force exerted upon the vehicle (e.g., first vehicle 101) during the crash (block 202). When the method 200 includes receiving the image data, the image data may be image data captured after the crash (e.g., using first image capturing device 105 or second image capturing device 125) (block 202). When the method 200 includes receiving the sensor data, the sensor data may include acceleration data associated with the crash (e.g., from one or more accelerometers, such as an accelerometer(s) of sensor(s) 108) (block 202). When the method 200 includes receiving the data indicative of the direction of the crash force exerted upon the vehicle during the crash, the data indicative of the direction of the crash force exerted upon the vehicle during the crash may include data such as that described in detail below (block 202).

The method 200 may include determining a type of geographic area in which the crash occurred (block 204). As discussed above, the type of geographic area may be determined at least in part by use of a GPS receiver in first vehicle 101, such as a GPS receiver of sensor(s) 108 (block 204). For instance, in one aspect, the GPS receiver may determine a location of first vehicle 101 at which first vehicle 101 was in the crash with second vehicle 102, and insurance provider server 126 may determine the type of geographic area (e.g., a type that is based upon a corresponding amount of expense of parts and/or labor; a type such as rural, urban, suburban, etc.) in which the crash occurred based upon the determined location of first vehicle 101 (block 204). In another aspect, the GPS receiver may determine the location of first vehicle 101, and another one(s) of sensor(s) 108 (and/or, for instance, on-board computing device 106 or first mobile computing device 104) may determine the type of geographic area based upon the determined location of first vehicle 101 (block 204). In this aspect, it should be appreciated that insurance provider server 126 may determine the type of geographic area by receiving (e.g., via network 118) an indication of the type of geographic area as determined by, for instance, the other one(s) of sensors 108, on-board computing device 106, and/or first mobile computing device 104 (block 204).

The method 200 may include determining (i) a make of first vehicle 101, (ii) a model of first vehicle 101, and/or (iii) a year of first vehicle 101 (block 206). With reference to the discussion above, in some aspects, the make, the model, and/or the year of first vehicle 101 may be determined based upon the image data representing at least one image of the exterior of first vehicle 101 (block 206). For instance, insurance provider server 126 may receive the image data via network 118 (e.g., from one or more of first mobile computing device 104, infrastructure component 120 or an associated image capturing device as described above, EMS vehicle 122 or an associated image capturing device as described above, or second mobile computing device 124) and perform any suitable image processing techniques on the received image data in order to determine the make, the model, and/or the year of first vehicle 101 (block 206). Additionally or alternatively, in some aspects, the make, the model, and/or the year of first vehicle 101 may be determined from stored data regarding first vehicle 101, such as data associated with the insurance coverage with respect to first vehicle 101 that may be stored at insurance provider server 126 (block 206). In other aspects, such data regarding first vehicle 101 may be additionally or alternatively stored in database 128, at vehicle characteristics information server 130, and/or any other suitable device(s) and/or location(s) not shown in FIG. 1 (block 206).

The method 200 may include determining an indication of whether first vehicle 101 is a total loss as a result of the crash (e.g., the crash with second vehicle 102, as described herein) based upon (i) the image data, the sensor data associated with the crash, and/or the data indicative of the direction of the crash force exerted upon first vehicle 101 during the crash; (ii) the type of geographic area in which the crash occurred; and (iii) the make, the model, and/or the year of first vehicle 101 (block 208). As such, it will be appreciated that various different combinations of data/factors may be utilized in various aspects in order to determine the indication of whether first vehicle 101 is a total loss (block 208). It will further be appreciated, such as in light of the discussion below, that some of the aforementioned data/factors that may be utilized in performing the actions described with respect to block 208 may be dependent upon and/or include one another. For instance, the data indicative of the direction of the crash force exerted upon first vehicle 101 may include at least some of the sensor data associated with the crash (e.g., may include acceleration data) (block 208).

Additionally, with reference to the discussion above, in some aspects, the determination described with respect to block 208 may include determining whether any of the data/factors described with respect to block 208 (e.g., type of geographic area; vehicle make, model, and/or year; image data, etc.) has a value(s), type(s), etc. that is/are similar to value(s), type(s), etc. of such data/factors that have previously been determined to correspond to a vehicle being a total loss. For instance, in some aspects, based upon previous determinations that vehicles are total losses, one or more models may be generated or constructed to indicate patterns, characteristics, etc. of the value(s), type(s), etc. of such data/factors that correspond, for instance, to a vehicle being a total loss after a crash. As such, in some aspects, the actions described with respect to block 208 may include determining patterns, characteristics, etc. of the value(s), type(s), etc. of data and/or factors such as those described above, and may further include determining the corresponding indication of whether the vehicle (e.g., first vehicle 101) is a total loss as indicated by a model(s) such as the model(s)

described herein. It will be appreciated in light of the teaching and disclosure herein that any suitable techniques for processing and/or analyzing (i) the image data, the sensor data associated with the crash, and/or the data indicative of the direction of the crash force exerted upon first vehicle 101 during the crash; (ii) the type of geographic area in which the crash occurred; and/or (iii) make, model, and/or year of first vehicle 101 may be utilized, such as any suitable machine learning technique(s) (block 208). Furthermore, it should be appreciated that the determination described with respect to block 208 may include any suitable weightings, multipliers, or other techniques of accounting for the various data and/or factors that may be the bases for the determination described with respect to block 208.

With continued reference to the use of a machine learning technique(s) in performing the determination described with respect to block 208, in various aspects, indications of the (i) make, model, and/or year of first vehicle 101, (ii) type of geographic area in which the crash occurred, and/or (iii) image data, sensor data associated with the crash, and/or data indicative of the direction of the crash force exerted upon first vehicle 101 during the crash may be input into a machine learning program (block 208). The machine learning program may be trained to determine whether first vehicle 101 has a likelihood of being a total loss that is higher than, for instance, a predetermined threshold and/or percentage, depending upon how the machine learning program determines or quantifies the likelihood of first vehicle 101 being a total loss (block 208). More particularly, the machine learning program may be trained to determine whether first vehicle 101 has a likelihood of being a total loss that is higher than a predetermined threshold and/or percentage based upon the indications of the (i) make, model, and/or year of first vehicle 101, (ii) type of geographic area in which the crash occurred, and/or (iii) image data, sensor data associated with the crash, and/or data indicative of the direction of the crash force exerted upon first vehicle 101 during the crash (block 208).

In some aspects, in order to train the machine learning program to determine whether first vehicle 101 has a likelihood of being a total loss that is higher than a predetermined threshold and/or percentage based upon factors such as those discussed above, depersonalized historical vehicle claim data may be input into the machine learning program. The input of such depersonalized historical vehicle claim data may, in various aspects, occur concurrently with performance of the actions described with respect to block 208 or may occur before performance of such actions (e.g., before performance of the method 200). In any event, when the machine learning program determines that first vehicle 101 has a likelihood of being a total loss that is higher than, for instance, a predetermined threshold and/or percentage based upon factors such as the indications discussed above, an indication that first vehicle 101 is a total loss may be determined (block 208).

The method 200 may include determining whether at least one component of the vehicle (e.g., an engine, a tail light, etc. of first vehicle 101) that has been in the crash is to be salvaged (or otherwise recovered and/or sold) (block 210). More particularly, in some aspects, determining whether at least one component of first vehicle 101 is to be salvaged is based upon at least one of the image data, the type of the geographic area in which the crash occurred, the sensor data associated with the crash, the data indicative of the direction of the crash force exerted upon first vehicle 101 during the crash, the make of first vehicle 101, the model of first vehicle 101, or the year of first vehicle 101 (block 210).

In some aspects, determining whether at least one component of first vehicle 101 is to be salvaged may include determining which component or components of first vehicle 101 are salvageable based upon the above data/factors described with respect to block 210. Determining whether a component(s) of first vehicle 101 is to be salvaged may further include determining the lesser of (i) the market value of first vehicle 101 minus the amount that the insurance provider would obtain for selling or otherwise disposing of the salvageable component(s) (which amount may depend upon, for instance, the type of the geographic area in which the crash occurred), and (ii) an estimated cost to repair first vehicle 101 (which may be determined based upon data/factors that are the same as or similar to those used in the determination described with respect to block 208 and/or the determination described with respect to block 210). If the market value of first vehicle 101 minus the amount that the insurance provider would obtain for selling or disposing of the salvageable component(s) is less than the estimated cost of repair (i.e., it makes more financial sense to cannibalize the vehicle for parts, rather than repair the vehicle), it may be determined that the at least one component of first vehicle 101 is to be salvaged (block 210). It should be appreciated that the determination of the indication of whether first vehicle 101 is a total loss may be determined concurrently with the determination of whether the at least one component of first vehicle 101 is to be salvaged. As such, it should be appreciated that the determination described with respect to block 210 may be performed concurrently with the determination described with respect to block 208.

By determining, based upon any one or more of the aforementioned data/factors described with respect to block 210, whether a component(s) of first vehicle 101 is to be salvaged after determining, as described with respect to block 208, the indication of whether first vehicle 101 is a total loss, first vehicle 101 may be brought to an appropriate location for salvage without the need to have first vehicle 101 stored, inspected, assessed, etc. and without the need to pay costs associated with such storage, inspection, assessment, etc. Thus, the total time and cost for disposing of first vehicle 101 and the components thereof, and for processing a related insurance claim with respect to the crash, may advantageously be reduced. Furthermore, it will be appreciated that necessary resources of the insurance provider may be reduced because, for instance, the indication of whether first vehicle 101 is a total loss may be determined (block 208), and whether a component(s) of first vehicle 101 is to be salvaged may be determined (block 210), without the need for an insurance agent to assess or inspect first vehicle 101 after the crash.

In some aspects, the determination described with respect to block 210 may include determining whether any of the aforementioned data/factors described with respect to block 210 has a value(s), type(s), etc. that is/are similar to value(s), type(s), etc. of such data/factors that have previously been determined to correspond to vehicles having components to be salvaged (block 210). For instance, as with the actions described with respect to block 208, a model(s) may be generated or constructed; patterns, characteristics, etc. of the value(s), type(s), etc. of data and/or factors such as those described above may be determined; and the model(s) may be used in determining whether at least one component of first vehicle 101 is to be salvaged (block 210). As with the actions described with respect to block 208, any suitable technique(s) for processing and/or analyzing such data/factors may be utilized, such as any suitable machine learning technique(s) (e.g., a machine learning technique as described with respect to block 208) (block 210).

It will be appreciated in light of the teaching and disclosure herein that by performing the determination(s) described with respect to, for instance, block 208 and/or block 210 based upon the data and/or factors described above, an ability to predict whether first vehicle 101 is a total loss may be improved and may remove the need for an insurance agent to assess first vehicle 101. For instance, and as further described with respect to FIG. 3, by basing the determination described with respect to block 208 upon the type of geographic area in which the crash occurred, the determination described with respect to block 208 may account for different amounts of expense that would be incurred if first vehicle 101 were to be repaired instead of declared a total loss.

The method 200 may include additional, less, or alternate actions, including those discussed elsewhere herein, and/or may include performing the determination(s) described with respect to, for instance, block 208 and/or block 210 based upon any suitable additional data and/or factors. For instance, the determination(s) described with respect to block 208 and/or block 210 may be further based upon a speed of first vehicle 101 at the time of the crash; whether one or more of sensor(s) 108 of first vehicle 101 are inoperable as a result of the crash as determined from, for instance, data sent to insurance provider server 126 by on-board computing device 106 and/or first mobile computing device 104; and/or injury data from the crash as received at insurance provider server 126, etc. Additionally, the method 200 may be implemented via an appropriate computing device(s) and/or processors thereof (e.g., insurance provider server 126), or via computer-executable instructions stored on non-transitory computer-readable medium or media.

Exemplary Use of Repair Expense in Determining Total Loss

Figure 3:
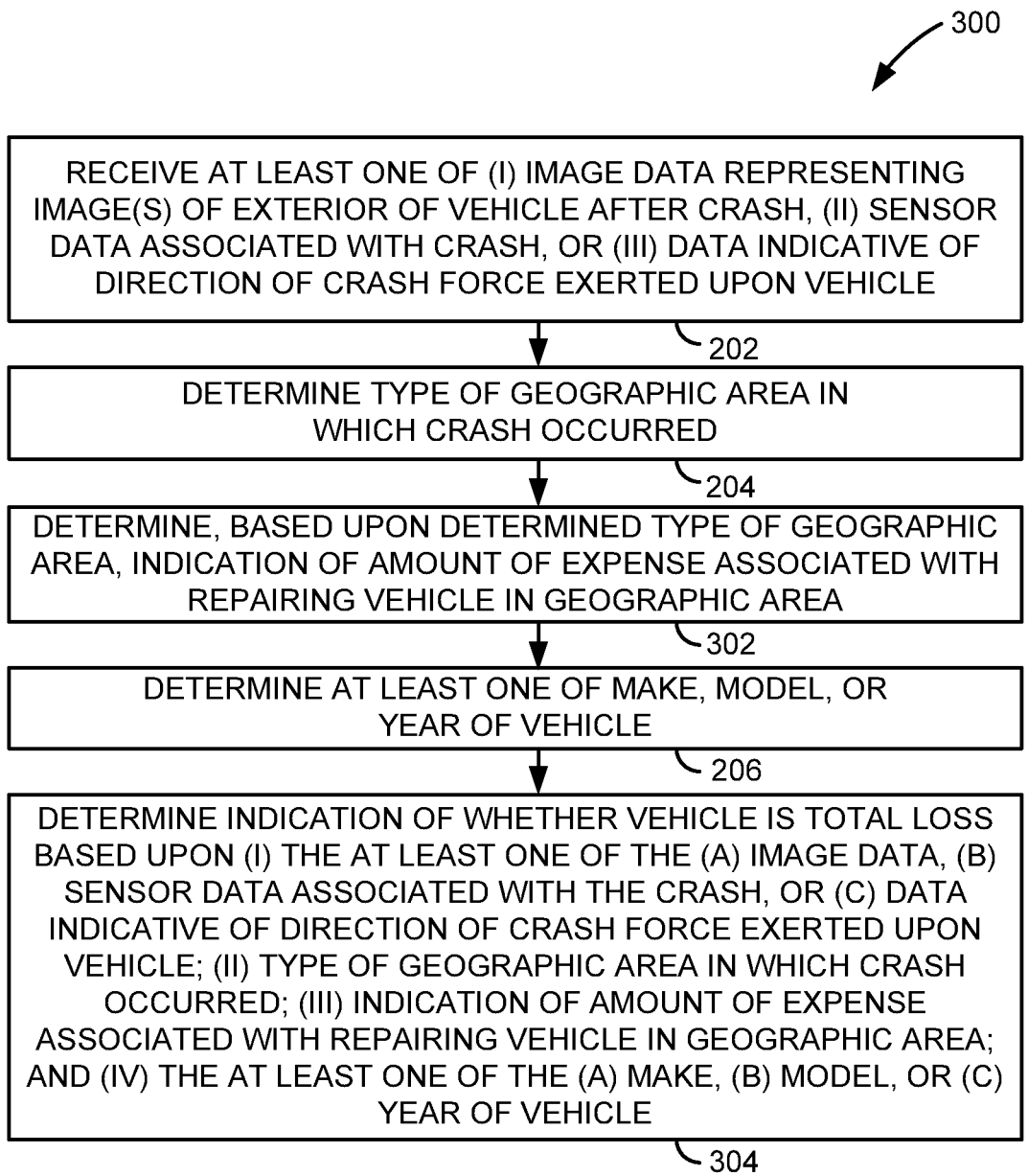
FIG. 3 illustrates another exemplary computer-implemented method 300 of determining an indication of whether a vehicle is a total loss in accordance with an exemplary aspect of the present disclosure.

FIG. 3 illustrates another exemplary computer-implemented method 300 of determining an indication of whether a vehicle is a total loss (e.g., of predicting total loss of a vehicle in a crash). In one aspect, the method 300 may be implemented by insurance provider server 126. For instance, the method 300 may be performed by one or more processors, applications, and/or routines that are part of, stored by, and/or otherwise accessible to insurance provider server 126. It will be appreciated in light of the teaching and disclosure herein that the method 300 may include a more particular implementation(s) of aspects of the method 200.

The method 300 may include performing the actions described with respect to blocks 202 and 204. Thus, the method 300 may include receiving (i) image data representing at least one image of an exterior of a vehicle (e.g., first vehicle 101), where the vehicle (e.g., first vehicle 101) has been in a crash (e.g., a crash with second vehicle 102, as illustrated in FIG. 1); (ii) sensor data associated with the crash; and/or (iii) data indicative of a direction of a crash force exerted upon the vehicle (e.g., first vehicle 101) during the crash, as described above (block 202). The method 300 may also include determining a type of geographic area in which the crash occurred, as described above (block 204).

The method 300 may also include determining, based upon the determined type of the geographic area in which the crash occurred, an indication of an amount of expense associated with repairing first vehicle 101 in the geographic area after the crash (block 302). In some aspects, one or more actions described with respect to the method 300, including the actions described with respect to block 302, may not be performed. For instance, as described above with respect to block 204, insurance provider server 126 may in one aspect determine the type of geographic area in which the crash occurred as a type that is based upon (e.g., indicative of or corresponding to) an amount of expense of parts and/or labor, and thus the determination of the amount of expense associated with repairing first vehicle 101 may be performed when the type of geographic area is determined as described with respect to block 204. In other aspects, however, the determined type of geographic area may be, for instance, a rural area, a suburban area, an urban area, and/or any other suitable determined type of geographic area, and based upon the determined type of geographic area and, in some cases, further based upon data regarding vehicle crashes, the indication of the amount of expense may be determined (block 302). For instance, the data regarding vehicle crashes may be claims data of (e.g., stored by or otherwise accessible to) the insurance provider from previous vehicle crashes (block 302).

The indication of the amount of expense associated with repairing first vehicle 101 may vary with the determined type of geographic area because of different cost(s) of parts and/or labor in different types of geographic areas (block 302). In some aspects, vehicle repair information server 132 may store or otherwise have access to information indicative of an amount of expense associated with repairing various types of vehicles (e.g., various makes, models, and/or years of vehicles, including in some instances a make, model, and/or year corresponding to that of first vehicle 101) in various types of geographic areas (block 302). As such, insurance provider server 126 may determine the indication of the amount of expense associated with repairing first vehicle 101 in the geographic area by receiving such an indication or corresponding data from vehicle repair information server 132 (block 302).

In some aspects, the data received from vehicle repair information server 132 and used to determine the indication of the amount of expense associated with repairing first vehicle 101 may be data that indicates one or more exact amounts of expense (e.g., an exact cost of a part or component in the determined type of geographic area or, in some cases, at the exact geographical location at which first vehicle 101 is to be repaired; an exact cost of labor in the determined type of geographic area or exact geographic location at which first vehicle 101 is to be repaired; etc.) (block 302). The exact geographic location at which first vehicle 101 is to be repaired may be determined, for instance, based upon a comparison of (i) GPS data such as that discussed above indicating the location of the crash with (ii) information regarding repair facilities, which information may be available from, for instance, vehicle repair information server 132 (block 302). The information regarding repair facilities may include information regarding the capabilities of various repair facilities, and an indication(s) of such capabilities may be received and compared (e.g., by insurance provider server 126) with an indication of an amount and/or type of damage to first vehicle 101 (e.g., as determined from the image data and/or other suitable factors described herein), one or more characteristics (e.g., make, model, and/or year) of first vehicle 101, etc. (block 302). As such, capabilities of different repair facilities in repairing the amount and/or type of damage to first vehicle 101 may be used as a basis for determining the exact geographic location at which first vehicle 101 is to be repaired (block 302).

The method 300 may include performing the actions described with respect to block 206 to determine the make, the model, and/or the year of first vehicle 101. The method 300 may also include determining an indication of whether first vehicle 101 is a total loss as a result of the crash (e.g., the crash with second vehicle 102, as described herein) based upon (i) the image data, the sensor data associated with the crash, and/or the data indicative of the direction of the crash force exerted upon first vehicle 101 during the crash; (ii) the type of geographic area in which the crash occurred; (iii) the indication of the amount of expense associated with repairing first vehicle 101 in the geographic area after the crash; and (iv) the make, the model, and/or the year of first vehicle 101 (block 304). As such, and as described with respect to the method 200, it will be appreciated that various different combinations of data/factors may be utilized in various aspects in order to determine the indication of whether first vehicle 101 is a total loss (block 304).

Additionally, and as described with respect to the method 200, in some aspects, the determination described with respect to block 304 may include determining whether any of the data/factors described with respect to block 304 has a value(s), type(s), etc. that is/are similar to value(s), type(s), etc. of such data/factors that have previously been determined to correspond to a vehicle being a total loss. This determination may be similar to that described with respect to block 208, and as discussed with respect to the method 200, it will be appreciated that any suitable techniques for processing and/or analyzing the above data and/or factors used in the determination described with respect to block 304 (e.g., any suitable machine learning technique(s), such as a machine learning technique as described with respect to block 208) may be utilized.

The method 300 may include additional, less, or alternate actions, including those discussed elsewhere herein (e.g., may include the actions described with respect to block 210), and/or may be implemented via an appropriate computing device(s) and/or processors thereof (e.g., insurance provider server 126), or via computer-executable instructions stored on non-transitory computer-readable medium or media.

Exemplary Use of Additional Vehicle Characteristic(s) in Determining Total Loss

Figure 4:
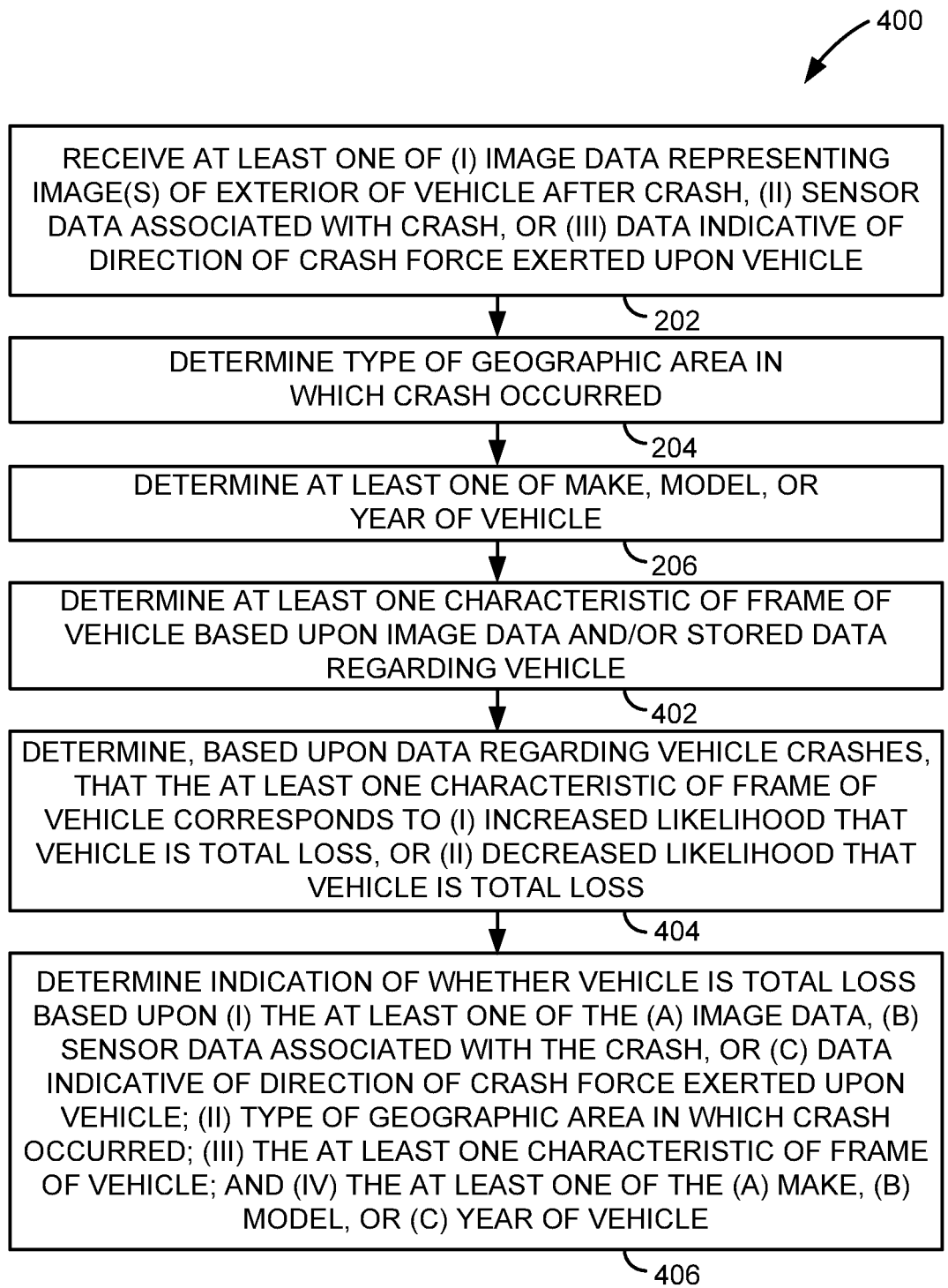
FIG. 4 illustrates yet another exemplary computer-implemented method 400 of determining an indication of whether a vehicle is a total loss in accordance with an exemplary aspect of the present disclosure.

FIG. 4 illustrates yet another exemplary computer-implemented method 400 of determining an indication of whether a vehicle is a total loss (e.g., of predicting total loss of a vehicle in a crash). In one aspect, the method 400 may be implemented by insurance provider server 126. For instance, the method 400 may be performed by one or more processors, applications, and/or routines that are part of, stored by, and/or otherwise accessible to insurance provider server 126. It will be appreciated in light of the teaching and disclosure herein that the method 400 may include a more particular implementation(s) of aspects of, for instance, the method 200.

The method 400 may include performing the actions described with respect to blocks 202, 204, and 206. Thus, the method 400 may include receiving (i) image data representing at least one image of an exterior of a vehicle (e.g., first vehicle 101), where the vehicle (e.g., first vehicle 101) has been in a crash (e.g., a crash with second vehicle 102, as illustrated in FIG. 1); (ii) sensor data associated with the crash; and/or (iii) data indicative of a direction of a crash force exerted upon the vehicle (e.g., first vehicle 101) during the crash, as described above (block 202). The method 400 may also include determining a type of geographic area in which the crash occurred, as described above (block 204). The method 400 may additionally include determining the make of first vehicle 101, the model of first vehicle 101, and/or the year of first vehicle 101, as described above (block 206).

The method 400 may also include determining at least one characteristic of a frame of the vehicle (e.g., first vehicle 101) based upon the image data and/or stored data regarding first vehicle 101 (block 402). The at least one characteristic of the frame of first vehicle 101 may be a type of the frame, one or more dimensions of the frame, and/or any other suitable characteristic(s) of the frame (block 402). In one aspect, the at least one characteristic of the frame of first vehicle 101 may be determined based upon the image data by, for instance, insurance provider server 126 processing the image data to identify vehicles (e.g., by make, model, and/or year) that have similar frames to that of first vehicle 101 (block 402). The identification of vehicles having similar frames to that of first vehicle 101 may be performed based upon identifying one or more characteristics of an appearance of first vehicle 101 (as indicated by the image data), and based upon comparing the one or more characteristics of the appearance of first vehicle 101 to data regarding other vehicles stored at, for instance, vehicle characteristics information server 130 (block 402).

In another aspect, the at least one characteristic of the frame of first vehicle 101 may be determined based upon stored data regarding first vehicle 101 (e.g., data indicating a make, model, and/or year of first vehicle 101 stored at or accessible to insurance provider server 126, with such stored data thereby indicating the at least one characteristic of the frame of first vehicle 101) (block 402). In yet another aspect, the at least one characteristic of the frame of first vehicle 101 may be determined based upon identification of the make, model, and/or year of first vehicle 101 from the image data (e.g., such identification being performed, for instance, by vehicle characteristics information server 130), and based upon resulting identification of the frame (and/or characteristic(s) thereof) of first vehicle 101 (e.g., by vehicle characteristics information server 130) (block 402). It will be appreciated that in examples where the at least one characteristic of the frame of first vehicle 101 is determined by vehicle characteristics information server 130, the at least one characteristic of the frame of first vehicle 101 may be determined by insurance provider server 126 by way of insurance provider server 126 receiving a suitable indication of the at least one characteristic of the frame of first vehicle 101 from vehicle characteristics information server 130 (block 402).

The method 400 may also include determining, based upon data regarding vehicle crashes, that the at least one characteristic of the frame of first vehicle 101 corresponds to one of (i) an increased likelihood that first vehicle 101 is a total loss as a result of the crash, or (ii) a decreased likelihood that first vehicle 101 is a total loss as a result of the crash (block 404). As discussed above, the data regarding vehicle crashes may be claims data of the insurance provider from previous vehicle crashes (block 404). In some aspects, such data regarding vehicle crashes may be or may include data indicating one or more frame characteristics of vehicles previously involved in crashes (block 404).

In one aspect, if such data regarding vehicle crashes indicates that a type(s) of vehicle(s) (e.g., a particular make(s), model(s), and/or year(s) of vehicle(s)) having the same at least one frame characteristic as first vehicle 101 has been a total loss relatively frequently in previous crashes, then it may be determined that the at least one characteristic of the frame of first vehicle 101 corresponds to an increased likelihood that first vehicle 101 is a total loss as a result of the crash (block 404). In another aspect, if such data regarding vehicle crashes indicates that a type(s) of vehicles(s) (e.g., a particular make(s), model(s), and/or year(s) of vehicle(s)) having the same at least one frame characteristic as first vehicle 101 has been a total loss relatively infrequently in previous crashes, then it may be determined that the at least one characteristic of the frame of first vehicle 101 corresponds to a decreased likelihood that first vehicle 101 is a total loss as a result of the crash (block 404). In yet another aspect, the data regarding vehicle crashes may be analyzed to determine types of vehicles that have had relatively more and/or relatively fewer total losses and to determine corresponding frame characteristics of such vehicles (block 404). Such corresponding frame characteristics may then be compared to the at least one characteristic of the frame of first vehicle 101 to determine if the at least one characteristic of the frame of first vehicle 101 corresponds to an increased or decreased likelihood of a total loss (block 404). In various aspects, it may be determined that a type(s) of vehicle(s) has been a total loss relatively frequently or relatively infrequently by, for instance, comparing the percentage or number of crashes involving the type(s) of vehicle(s) that have resulted in total loss to a threshold or predetermined percentage or number (block 404).

The method 400 may include determining an indication of whether first vehicle 101 is a total loss as a result of the crash (e.g., the crash with second vehicle 102, as described herein) based upon (i) the image data, the sensor data associated with the crash, and/or the data indicative of the direction of the crash force exerted upon first vehicle 101 during the crash; (ii) the type of geographic area in which the crash occurred; (iii) the at least one characteristic of the frame of first vehicle 101; and (iv) the make, the model, and/or the year of first vehicle 101 (block 406). As such, and as described with respect to, for instance, the method 200, it will be appreciated that various different combinations of data/factors may be utilized in various aspects in order to determine the indication of whether first vehicle 101 is a total loss (block 406). More particularly, it will be appreciated that when first vehicle 101 has a frame and/or frame characteristic(s) that are determined to correspond to increased likelihood of total loss as described above, it may be more likely that the actions described with respect to block 406 will result in a determination that first vehicle 101 is a total loss (block 406). Correspondingly, it may be less likely that the actions described with respect to block 406 will result in a determination that first vehicle 101 is a total loss when first vehicle 101 has a frame and/or frame characteristic(s) that are determined to correspond to decreased likelihood of total loss as described above (block 406).

It should be appreciated that the determination described with respect to block 406, and the similar determinations described with respect to, for instance, block 208 and block 304, may include any suitable weightings, multipliers, or other techniques of accounting for the various data and/or factors that may be the bases for such determinations. For instance, any suitable weighting of characteristics of the image data may be utilized, any suitable weight or other significance may be given to the type of geographical area, any suitable weight or other significance may be given to an increased or decreased likelihood (which increased or decreased likelihood may be suitably quantified based upon the data regarding vehicle crashes) that first vehicle 101 is a total loss as described with respect to block 404, etc. As another example, the data indicative of the direction of the crash force exerted upon first vehicle 101 may be suitably utilized in conjunction with the at least one characteristic of the frame of first vehicle 101 to determine whether the direction of the crash force exerted upon first vehicle 101 is relatively likely or unlikely to result in a total loss in view of the at least one characteristic of the frame of first vehicle 101 that is impacted (block 406).

For instance, it may be determined, using the data regarding vehicle crashes, that a direction of a crash force that typically corresponds to first vehicle 101 being impacted in a front area of first vehicle 101 corresponds to a relatively high likelihood of total loss in view of the at least one characteristic of the frame of first vehicle 101 (e.g., because more expensive parts may be located at the front of vehicle 101 and may be more easily damaged in view of the frame characteristic(s) of vehicle 101) (block 406). In some aspects, such a determination of whether the direction of the crash force exerted upon first vehicle 101 is relatively likely or unlikely to result in a total loss in view of the at least one characteristic of the frame of first vehicle 101 may quantified in any suitable manner, and may be utilized in performing the overall determination described with respect to block 406.

Additionally, in some aspects, the determination described with respect to block 406 may include determining whether any of the data/factors described with respect to block 406 has a value(s), type(s), etc. that is/are similar to value(s), type(s), etc. of such data/factors that have previously been determined to correspond to a vehicle being a total loss. This determination may be similar to that described with respect to block 208 and block 304, and as discussed with respect to the method 200, it will be appreciated that any suitable techniques for processing and/or analyzing the above data and/or factors used in the determination described with respect to block 406 (e.g., any suitable machine learning technique(s), such as a machine learning technique as described with respect to block 208) may be utilized.

The method 400 may include additional, less, or alternate actions, including those discussed elsewhere herein (e.g., may include the actions described with respect to block 210), and/or may be implemented via an appropriate computing device(s) and/or processors thereof (e.g., insurance provider server 126), or via computer-executable instructions stored on non-transitory computer-readable medium or media.

Figure 5:
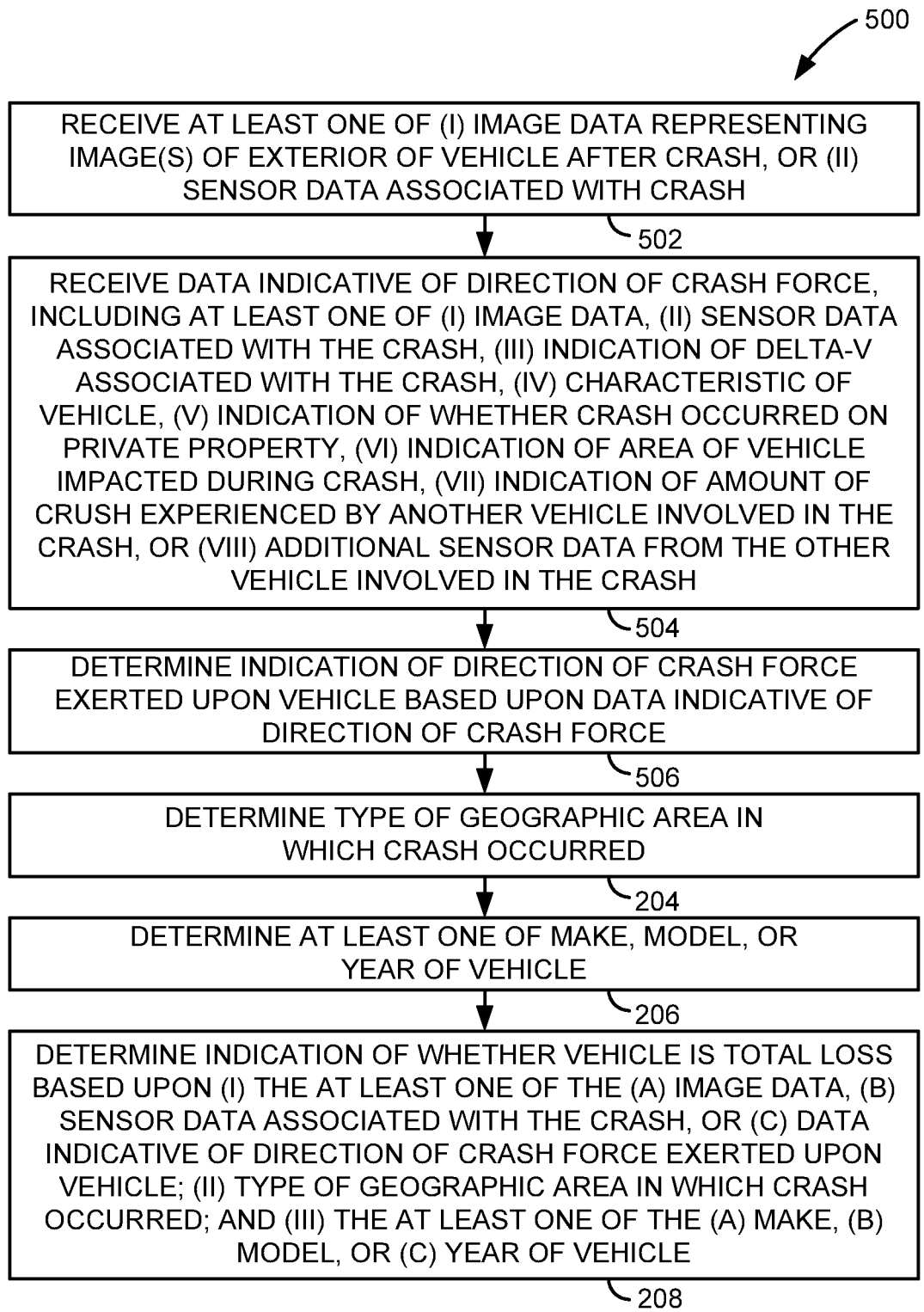
FIG. 5 illustrates yet another exemplary computer-implemented method 500 of determining an indication of whether a vehicle is a total loss in accordance with an exemplary aspect of the present disclosure.

Exemplary Use of Data Indicative of Direction of Crash Force in Determining Total Loss FIG. 5 illustrates yet another exemplary computer-implemented method 500 of determining an indication of whether a vehicle is a total loss (e.g., of predicting total loss of a vehicle in a crash). In one aspect, the method 500 may be implemented by insurance provider server 126. For instance, the method 500 may be performed by one or more processors, applications, and/or routines that are part of, stored by, and/or otherwise accessible to insurance provider server 126. It will be appreciated in light of the teaching and disclosure herein that the method 500 may include a more particular implementation(s) of aspects of, for instance, the method 200.

The method 500 may include receiving (i) image data representing at least one image of an exterior of a vehicle (e.g., first vehicle 101), where the vehicle (e.g., first vehicle 101) has been in a crash (e.g., a crash with second vehicle 102, as illustrated in FIG. 1); and/or (ii) sensor data associated with the crash (block 502). It will be appreciated that the actions described with respect to block 502 may be the same as various actions described with respect to block 202.

The method 500 may also (or alternatively) include receiving the data indicative of the direction of the crash force exerted upon first vehicle 101 (block 504). In some aspects, receiving the data indicative of the direction of the crash force exerted upon first vehicle 101 may include receiving data also described above with respect to block 502, and/or may include receiving additional data not described above with respect to block 502 (block 504). For instance, receiving the data indicative of the direction of the crash force exerted upon first vehicle 101 may include receiving (i) the image data representing the at least one image of the exterior of first vehicle 101 after the crash; (ii) the sensor data associated with the crash; (iii) an indication of a Delta-V associated with the crash; (iv) a characteristic of first vehicle 101; (v) an indication of whether the crash occurred on private property; (vi) an indication of an area of first vehicle 101 impacted during the crash; (vii) an indication of an amount of crush experienced by another vehicle (e.g., second vehicle 102) involved in the crash with first vehicle 101; and/or (viii) additional sensor data from the other vehicle (e.g., second vehicle 102) involved in the crash (block 504). With reference to the discussion above, the actions described with respect to block 504 may be performed when an SRS module (or airbag ECU) is inoperative or when crash data indicative of the direction of the crash force exerted upon the vehicle otherwise cannot be retrieved from the SRS module without an insurance agent or other representative physically assessing the vehicle. With further reference to the discussion above, it will be appreciated that the actions described with respect to block 504 may be the same as various actions described with respect to block 202.

The indication of the Delta-V associated with the crash may be an indication of Delta-V as used in vehicle crash analysis, and thus may be an indication of the difference between the velocity of first vehicle 101 before and after the crash of first vehicle 101 (block 504). Higher values of Delta-V may, for instance, indicate higher vehicle crash severity, higher likelihood of first vehicle 101 experiencing a larger amount of crush from the crash with second vehicle 102 (and, for example, correspondingly higher likelihood of the crash force exerted upon first vehicle 101 being in a direction corresponding to a larger amount of crush of first vehicle 101), etc. (block 504).

In various aspects, the characteristic of first vehicle 101 may be a characteristic such as make, model, year, frame type, frame characteristic (or characteristics), and/or any other suitable characteristic(s) (block 504). In one aspect, the characteristic (or characteristics) of first vehicle 101 may be analyzed in conjunction with, for instance, the image data to determine an indication of a direction of the crash force exerted upon first vehicle 101 (block 504). For example, for a particular type of vehicle, image data having certain characteristics (e.g., showing damage to certain areas of first vehicle 101) may indicate a certain direction of the crash force exerted upon such a vehicle (e.g., first vehicle 101) (block 504).

In another aspect, the sensor data associated with the crash may not include data from one or more of sensor(s) 108 because the one or more of sensor(s) 108 may have been damaged in the crash (block 504). Depending upon the one or more of sensor(s) 108 that may thus be inferred to have been damaged, a particular direction of the crash force exerted upon first vehicle 101 may be indicated (block 504). Additionally or alternatively, in various aspects, the indication of the area of first vehicle 101 impacted during the crash may be determined from the image data and/or from the sensor data associated with the crash, and/or from any other suitable source, and the indication of the area of first vehicle 101 impacted during the crash may additionally or alternatively be used in determining an indication of a direction of the crash force exerted upon first vehicle 101 (block 504).

In yet another aspect, the indication of whether the crash occurred on private property may be determined based upon, for instance, GPS data received from sensor(s) 108, GPS data received from second mobile computing device 124 when second mobile computing device 124 is at the site of the crash, etc. (block 504). For instance, the GPS data may indicate that the crash occurred in a parking lot or driveway (and thus on private property) as opposed to, for example, a two-lane highway (block 504). In some aspects, inferences or assumptions may be made based upon whether the crash is indicated to have occurred on private property (block 504). For instance, if the crash is indicated to have occurred on private property, such as a driveway or parking lot, and it is also indicated that a front of first vehicle 101 is damaged, it may be inferred or assumed (absent, for instance, sensor data from sensor(s) 108 to the contrary) that the front of first vehicle 101 struck the rear of second vehicle 102 (block 504). Such an inference or assumption may be based upon a known higher probability (e.g., as indicated by the data regarding vehicle crashes stored at insurance provider server 126) of damage to a front of a vehicle on private property occurring because the front-damaged vehicle rear-ended another vehicle (as opposed to, for instance, another vehicle having backed into the front of the front-damaged vehicle) (block 504).

It will be appreciated, however, that any suitable inferences or assumptions may be made based upon, for instance, the data regarding vehicle crashes stored at insurance provider server 126 (block 504). With reference to the discussion above, it will further be appreciated that any inferences or assumptions may not be made when, for instance, sensor data from one or more of sensor(s) 108 indicates that such an inference(s) and/or assumption(s) would be incorrect (block 504). For example, an accelerometer(s) of sensor(s) 108 may indicate that first vehicle 101 was hit by second vehicle 102 backing into first vehicle 101 (block 504). In any event, such inferences or assumptions, and/or contrary data, may be used to determine an indication of the direction of the crash force exerted upon first vehicle 101 and, in some aspects, whether first vehicle 101 was accordingly struck in an area and/or in a manner more likely to cause vehicle 101 to be indicated to be a total loss, as described with respect to block 208.

Additionally or alternatively, as discussed above, in various aspects, data regarding another vehicle (e.g., second vehicle 102) may be received in performing the actions described with respect to block 504. For instance, an indication of an amount of crush experienced by second vehicle 102 (e.g., as determined based upon factors such as a Delta-V of second vehicle 102 and a type of second vehicle 102), and/or additional sensor data from second vehicle 102 (e.g., data from sensor(s) of second vehicle 102 that is/are the same as sensor(s) 108) may be received as data indicative of the direction of the crash force exerted upon first vehicle 101 (block 504). Such data may be received, for instance, when second vehicle 102 is also insured by the insurance provider (block 504). Such data may be received and used in conjunction with any other suitable data such as the examples discussed above to determine an indication of the direction of the crash force exerted upon first vehicle 101. In one aspect, the additional sensor data from second vehicle 102 may be data from an accelerometer(s) of second vehicle 102, and may be received as described with respect to block 504 (e.g., at insurance provider server 126) along with data from an accelerometer(s) of first vehicle 101 (block 504). In various aspects, the receipt and analysis of data from multiple vehicles (e.g., first vehicle 101 and second vehicle 102) involved in a crash may increase the accuracy of an indication of the direction of the crash force exerted upon first vehicle 101, and thus may increase the accuracy of an ultimate indication of whether first vehicle 101 is a total loss.

The method 500 may also include determining, based upon the data indicative of the direction of the crash force exerted upon first vehicle 101 during the crash, an indication of the direction of the crash force exerted upon first vehicle 101 during the crash (block 506). For instance, in various aspects, the data received as described with respect to block 504 may be utilized in any suitable manner (such as in one of the example manners described above with respect to block 504) to determine the indication of the direction of the crash force exerted upon first vehicle 101 during the crash (block 506).

The method 500 may further include performing the actions described with respect to blocks 204 and 206 to determine the type of the geographic area in which the crash occurred (block 204) and to determine the make, model, and/or year of first vehicle 101 (block 206). It will be appreciated that at least some of the actions described with respect to block 206 may, in some aspects, already have been performed by way of receipt of the data described with respect to block 504.

The method 500 may also include performing the actions described with respect to block 208. It should be appreciated that by including the performing of the actions described with respect to block 208, the method 500 may include determining the indication of whether first vehicle 101 is a total loss based upon data and/or factors used to determine the indication of the direction of the crash force exerted upon first vehicle 101 as described with respect to block 506. Among other examples, the year of first vehicle 101 (which, as will be appreciated, may correspond to an age of first vehicle 101) may, for instance, be utilized in conjunction with the determined indication of the direction of the crash force and the stored data regarding vehicle crashes, which stored data may indicate that a vehicle having the age of first vehicle 101 is relatively more likely, or relatively less likely, to be a total loss given the direction of the crash force (block 208).

The method 500 may include additional, less, or alternate actions, including those discussed elsewhere herein (e.g., may include the actions described with respect to block 210), and/or may be implemented via an appropriate computing device(s) and/or processors thereof (e.g., insurance provider server 126), or via computer-executable instructions stored on non-transitory computer-readable medium or media.

Exemplary Computing Device

Figure 6:
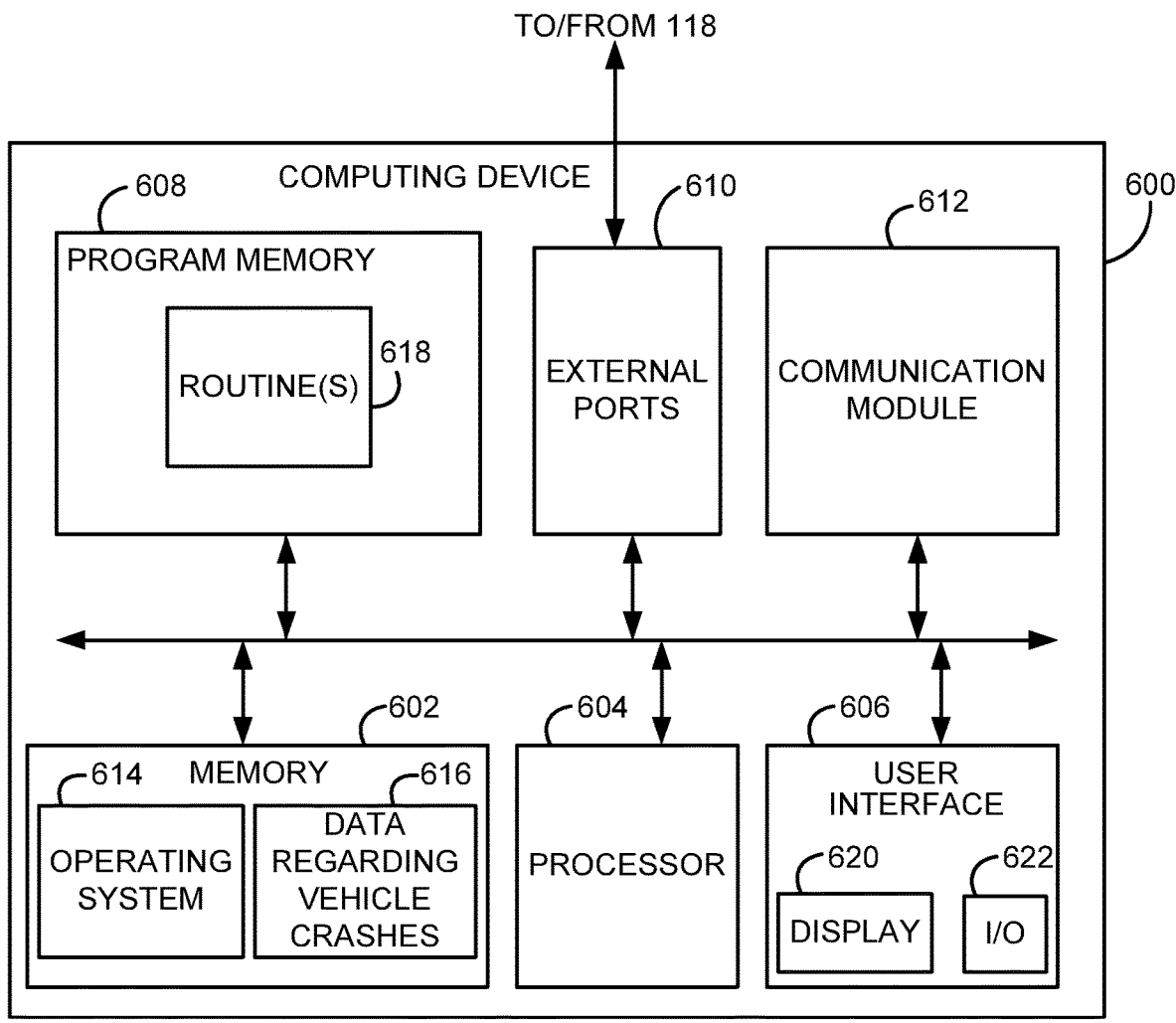
FIG. 6 illustrates a block diagram of an exemplary computing device 600 that may implement one or more of the functionalities discussed herein in accordance with an exemplary aspect of the present disclosure.

FIG. 6 illustrates a diagram of an exemplary computing device 600 that may implement one or more of the functionalities discussed herein. Computing device 600 may be an implementation of any suitable computing device discussed herein, such as, for instance, an implementation of insurance provider server 126. While computing device 600 is illustrated as including certain components and functionality, it should be appreciated that additional, alternate, or fewer components and/or functionality may be included in computing device 600 (e.g., in any one or more of the computing devices discussed elsewhere herein).

Computing device 600 may include a memory 602, a processor 604, a user interface 606, a program memory 608, external ports 610, and a communication module 612. In one aspect, memory 602 may store an operating system 614 configured to facilitate the functionality of computing device 600 as described herein, and may store sensor and telematics data 615 and data regarding vehicle crashes 616. Sensor and telematics data 615 may be or may include any suitable sensor and telematics data, such as the first set of sensor data and telematics data and/or the second set of sensor data and telematics data described above with respect to the methods 600, 700, and/or 800. Sensor and telematics data 615 may be received as described elsewhere herein, and may, for instance, be received at insurance provider server 126 via network 118. Additionally, data regarding vehicle crashes 616 may be or may include any suitable data regarding vehicle crashes, such as that discussed elsewhere herein.

Program memory 608 may store one or more routines or applications (e.g., machine readable instructions) 618. For instance, when computing device 600 is an implementation of insurance provider server 126, routine(s) 618 may include a routine configured to use sensor and telematics data 615, data regarding vehicle crashes 616, and/or other data discussed herein to determine an indication of whether a vehicle (e.g., first vehicle 101) is a total loss, such as in the manner described with respect to one or more of the methods 200, 300, 400, 500, 600, 700, or 800. It should be appreciated that other routine(s) and/or application(s) are envisioned, including when computing device 600 is an implementation of a computing device other than insurance provider server 126 (e.g., when computing device 600 is an implementation of first mobile computing device 104).

Processor 604 may interface with memory 602 to execute operating system 614 and routine(s) 618. In some aspects, routine(s) 618 may access sensor and telematics data 615 and/or data regarding vehicle crashes 616 to determine the indication of whether first vehicle 101 is a total loss, as described elsewhere herein. Memory 602 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and/or other suitable form(s) of memory.

Communication module 612 may be configured to communicate data, such as sensor and telematics data 615, data regarding vehicle crashes 616 and/or the determined indication of whether first vehicle 101 is a total loss, via one or more networks such as network 118. In one aspect, communication module 612 may include one or more transceivers (e.g., WWAN, WLAN, WPAN transceivers, and/or any other suitable type(s) of transceiver(s)) functioning in accordance with IEEE standards, 3GPP standards, or other standards, and configured to receive and transmit data via external ports 610. Thus, the one or more transceivers may be regarded as associated with processor 602 and/or as associated with computing device 600. In one aspect, only a single external port 610 may be implemented in computing device 600. For instance, communication module 612 may send, via network 118, the determined indication of whether first vehicle 101 is a total loss to, for example, first mobile computing device 104 and/or any other suitable computing device(s).

User interface 606 may be configured to present information to a user and/or receive inputs from the user. As illustrated in FIG. 6, user interface 606 may include a display 620 and I/O components 622 (e.g., ports, capacitive or resistive touch sensitive input panels, keys, buttons, lights, LEDs, speakers, microphones, etc.). The user may access the computing device 600 via user interface 606 to view and/or use the determined indication of whether first vehicle 101 is a total loss, and/or to perform any other suitable function(s). In one aspect, computing device 600 may perform the functionalities as discussed herein as part of a "cloud" network and/or may otherwise communicate with other hardware or software components within the cloud to send, retrieve, and/or otherwise analyze data. It should be appreciated that in view of the various components thereof, computing device 600 may also be referred to as a "computer system" or "computing system." It should be further appreciated that multiple implementations of computing device 600 (e.g., where insurance provider server 126 includes more than one insurance provider server) may also be referred to as a "computer system" or "computing system."

In general, a computer program product in accordance with an aspect may include a non-transitory computer-readable storage medium (e.g., standard random access memory (RAM), an optical disc, a universal serial bus (USB) drive, or the like) having computer-readable program code embodied therein, wherein the computer-readable program code is configured/adapted to be executed by processor 604 (e.g., working in connection with operating system 614) to facilitate the functions as described herein. In this regard, the program code may be implemented in any desired language, and may be implemented as machine code, assembly code, byte code, interpretable source code or the like (e.g., via Python, or other languages, such as C, C++, Java, Actionscript, Objective-C, Javascript, CSS, XML, etc.). In some aspects, the computer program product may be part of a cloud network of resources.

Exemplary Method of Determining Indication of Whether Vehicle is Total Loss

As depicted by, and discussed in relation to, FIGS. 1-6, for example, in one aspect, a computer-implemented method of determining an indication of whether a vehicle in a crash is a total loss may be provided. The method may include (1) receiving, by one or more processors (such as via wireless communication or data transmission over one or more radio frequency links or wireless communication channels), at least one of (i) image data representing at least one image of an exterior of the vehicle, the vehicle having been in the crash, the image data being image data captured after the crash, (ii) sensor data associated with the crash, the sensor data including acceleration data associated with the crash, or (iii) data indicative of a direction of a crash force exerted upon the vehicle during the crash; (2) determining, by the one or more processors, a type of geographic area in which the crash occurred; (3) determining, by the one or more processors, at least one of (i) a make of the vehicle, (ii) a model of the vehicle, or (iii) a year of the vehicle; and/or (4) determining, by the one or more processors, the indication of whether the vehicle is a total loss as a result of the crash based upon (i) the at least one of (a) the image data, (b) the sensor data associated with the crash, or (c) the data indicative of the direction of the crash force exerted upon the vehicle during the crash, (ii) the type of geographic area in which the crash occurred, and (iii) the at least one of (a) the make of the vehicle, (b) the model of the vehicle, or (c) the year of the vehicle.

The method may include determining, by the one or more processors, at least one characteristic of a frame of the vehicle based upon at least one of the image data or stored data regarding the vehicle, wherein determining the indication of whether the vehicle is a total loss may be further based upon the at least one characteristic of the frame of the vehicle. The method may also include determining, by the one or more processors based upon data regarding vehicle crashes, that the at least one characteristic of the frame of the vehicle corresponds to one of (i) an increased likelihood that the vehicle is a total loss as a result of the crash, or (ii) a decreased likelihood that the vehicle is a total loss as a result of the crash.

The method may include determining, by the one or more processors, whether at least one component of the vehicle is to be salvaged based upon at least one of the image data, the type of the geographic area in which the crash occurred, the sensor data associated with the crash, the data indicative of the direction of the crash force exerted upon the vehicle during the crash, the make of the vehicle, the model of the vehicle, or the year of the vehicle.

The method may include determining, by the one or more processors based upon the determined type of the geographic area in which the crash occurred, an indication of an amount of expense associated with repairing the vehicle in the geographic area after the crash, wherein determining the indication of whether the vehicle is a total loss may be further based upon the indication of the amount of the expense associated with repairing the vehicle in the geographic area after the crash.

Receiving the data indicative of the direction of the crash force exerted upon the vehicle during the crash may include receiving, by the one or more processors, at least one of (i) the image data, (ii) the sensor data associated with the crash, (iii) an indication of a Delta-V associated with the crash, (iv) a characteristic of the vehicle, (v) an indication of whether the crash occurred on private property, (vi) an indication of an area of the vehicle impacted during the crash, (vii) an indication of an amount of crush experienced by another vehicle involved in the crash with the vehicle, or (viii) additional sensor data from the other vehicle involved in the crash with the vehicle. For example, receiving the data indicative of the direction of the crash force exerted upon the vehicle during the crash may include receiving, by the one or more processors, at least one of (i) the sensor data associated with the crash, or (ii) the additional sensor data from the other vehicle involved in the crash with the vehicle. The method may further include determining, by the one or more processors, an indication of the direction of the crash force exerted upon the vehicle during the crash based upon the data indicative of the direction of the crash force exerted upon the vehicle during the crash.

The method may include additional, less, or alternate functionality, including that discussed elsewhere herein, and/or may be implemented via an appropriate computing device(s) and/or processors thereof, or via computer-executable instructions stored on non-transitory computer-readable medium or media.

Exemplary Computer System Configured to Determine Indication of Whether Vehicle is Total Loss As depicted by, and discussed in relation to, FIGS. 1-6, for example, in one aspect, a computer system configured to determine an indication of whether a vehicle in a crash is a total loss may be provided. The computer system may include at least one of (i) one or more processors, (ii) one or more servers, (iii) one or more sensors, or (iv) one or more transceivers. The computer system may be configured to: (1)

receive (such as via wireless communication or data transmission over one or more radio frequency links or wireless communication channels) at least one of (i) image data representing at least one image of an exterior of the vehicle, the vehicle having been in the crash, the image data being image data captured after the crash, (ii) sensor data associated with the crash, the sensor data including acceleration data associated with the crash, or (iii) data indicative of a direction of a crash force exerted upon the vehicle during the crash; (2) determine a type of geographic area in which the crash occurred; (3) determine at least one of (i) a make of the vehicle, (ii) a model of the vehicle, or (iii) a year of the vehicle; and/or (4) determine the indication of whether the vehicle is a total loss as a result of the crash based upon (i) the at least one of (a) the image data, (b) the sensor data associated with the crash, or (c) the data indicative of the direction of the crash force exerted upon the vehicle during the crash, (ii) the type of geographic area in which the crash occurred, and (iii) the at least one of (a) the make of the vehicle, (b) the model of the vehicle, or (c) the year of the vehicle.

The computer system may be further configured to (i) determine at least one characteristic of a frame of the vehicle based upon at least one of the image data or stored data regarding the vehicle; and (ii) determine the indication of whether the vehicle is a total loss further based upon the at least one characteristic of the frame of the vehicle. The computer system may also be further configured to determine, based upon data regarding vehicle crashes, that the at least one characteristic of the frame of the vehicle corresponds to one of (i) an increased likelihood that the vehicle is a total loss as a result of the crash, or (ii) a decreased likelihood that the vehicle is a total loss as a result of the crash.

The computer system may be further configured to determine whether at least one component of the vehicle is to be salvaged based upon at least one of the image data, the type of the geographic area in which the crash occurred, the sensor data associated with the crash, the data indicative of the direction of the crash force exerted upon the vehicle during the crash, the make of the vehicle, the model of the vehicle, or the year of the vehicle.

The computer system may be further configured to (i) determine, based upon the determined type of the geographic area in which the crash occurred, an indication of an amount of expense associated with repairing the vehicle in the geographic area after the crash; and (ii) determine the indication of whether the vehicle is a total loss further based upon the indication of the amount of the expense associated with repairing the vehicle in the geographic area after the crash.

The computer system may be further configured to (i) receive the data indicative of the direction of the crash force exerted upon the vehicle during the crash by receiving at least one of (a) the image data, (b) the sensor data associated with the crash, (c) an indication of a Delta-V associated with the crash, (d) a characteristic of the vehicle, (e) an indication of whether the crash occurred on private property, (f) an indication of an area of the vehicle impacted during the crash, (g) an indication of an amount of crush experienced by another vehicle involved in the crash with the vehicle, or (h) additional sensor data from the other vehicle involved in the crash with the vehicle; and (ii) determine an indication of the direction of the crash force exerted upon the vehicle during the crash based upon the data indicative of the direction of the crash force exerted upon the vehicle during the crash. The computer system may be configured with additional, less, or alternate functionality, including that discussed elsewhere herein.

Exemplary System of Determining Indication of Whether Vehicle is Total Loss

As depicted by, and discussed in relation to, FIGS. 1-6, for example, in one aspect, a system of determining an indication of whether a vehicle in a crash is a total loss may be provided. The system may include one or more insurance provider computing devices associated with an insurance provider. The one or more insurance provider computing devices may be configured to: (1) receive (such as via wireless communication or data transmission over one or more radio frequency links or wireless communication channels) at least one of (i) image data representing at least one image of an exterior of the vehicle, the vehicle having been in the crash, the image data being image data captured after the crash, (ii) sensor data associated with the crash, the sensor data including acceleration data associated with the crash, or (iii) data indicative of a direction of a crash force exerted upon the vehicle during the crash; (2) determine a type of geographic area in which the crash occurred; (3) determine at least one of (i) a make of the vehicle, (ii) a model of the vehicle, or (iii) a year of the vehicle; and/or (4) determine the indication of whether the vehicle is a total loss as a result of the crash based upon (i) the at least one of (a) the image data, (b) the sensor data associated with the crash, or (c) the data indicative of the direction of the crash force exerted upon the vehicle during the crash, (ii) the type of geographic area in which the crash occurred, and (iii) the at least one of (a) the make of the vehicle, (b) the model of the vehicle, or (c) the year of the vehicle.

The system may further include an image capturing device configured to capture the image data after the crash. The one or more insurance provider computing devices may be further configured to (i) determine at least one characteristic of a frame of the vehicle based upon at least one of the image data or stored data regarding the vehicle; and (ii) determine the indication of whether the vehicle is a total loss further based upon the at least one characteristic of the frame of the vehicle. The one or more insurance provider computing devices may also be further configured to determine, based upon data regarding vehicle crashes, that the at least one characteristic of the frame of the vehicle corresponds to one of (i) an increased likelihood that the vehicle is a total loss as a result of the crash, or (ii) a decreased likelihood that the vehicle is a total loss as a result of the crash.

The one or more insurance provider computing devices may be further configured to determine whether at least one component of the vehicle is to be salvaged based upon at least one of the image data, the type of the geographic area in which the crash occurred, the sensor data associated with the crash, the data indicative of the direction of the crash force exerted upon the vehicle during the crash, the make of the vehicle, the model of the vehicle, or the year of the vehicle.

The one or more insurance provider computing devices may be further configured to: (i) determine, based upon the determined type of the geographic area in which the crash occurred, an indication of an amount of expense associated with repairing the vehicle in the geographic area after the crash; and (ii) determine the indication of whether the vehicle is a total loss further based upon the indication of the amount of the expense associated with repairing the vehicle in the geographic area after the crash.

The system may further include one or more sensors associated with the vehicle. The one or more sensors may be configured to generate the sensor data associated with the crash. The one or more insurance provider computing devices may be further configured to receive the data indicative of the direction of the crash force exerted upon the vehicle during the crash by receiving at least one of (i) the image data, (ii) the sensor data associated with the crash, (iii) an indication of a Delta-V associated with the crash, (iv) a characteristic of the vehicle, (v) an indication of whether the crash occurred on private property, (vi) an indication of an area of the vehicle impacted during the crash, (vii) an indication of an amount of crush experienced by another vehicle involved in the crash with the vehicle, or (viii) additional sensor data from the other vehicle involved in the crash with the vehicle. For example, the system may include one or more additional sensors associated with the other vehicle involved in the crash with the vehicle. The one or more additional sensors may be configured to generate the additional sensor data from the other vehicle involved in the crash with the vehicle. The one or more insurance provider computing devices may be configured to at least one of (i) receive the sensor data associated with the crash from the one or more sensors, or (ii) receive the additional sensor data from the one or more additional sensors associated with the other vehicle involved in the crash with the vehicle. The one or more insurance provider computing devices may be further configured to determine an indication of the direction of the crash force exerted upon the vehicle during the crash based upon the data indicative of the direction of the crash force exerted upon the vehicle during the crash. The system may include additional, less, or alternate functionality, including that discussed elsewhere herein.

Machine Learning & Other Matters

The computer-implemented methods discussed herein may include additional, less, or alternate actions, including those discussed elsewhere herein. The methods may be implemented via one or more local or remote processors, transceivers, and/or sensors (such as processors, transceivers, and/or sensors mounted on vehicles or mobile devices, or associated with smart infrastructure or remote servers), and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as image, mobile device, vehicle claims, vehicle telematics, autonomous vehicle, and/or intelligent home telematics data. The machine learning programs may utilize deep learning algorithms that may be primarily focused on pattern recognition, and may be trained after processing multiple examples.

The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. In one embodiment, machine learning techniques may be used to extract data about the mobile device or vehicle from device details, mobile device sensors, geolocation information, image data, telematics data, and/or other data. The processing element may also learn how to identify characteristics and patterns that may then be applied to analyzing sensor data, authentication data, image data, telematics data, mobile device data, and/or other data.

In some embodiments, machine learning programs may be trained using legacy sensor and/or telematics data. After which, sensor and/or telematics data may be received in real-time or near real-time from one or more vehicles, or associated mobile devices, involved in a vehicle collision.

The machine learning programs may accept the sensor and/or telematics data as input, and determine, inter alia, type of geographic area in which the vehicle collision occurred; image data such as that described above; energy involved with a vehicle collision; directionality of the vehicle collision (such as in what direction were the vehicles traveling); point/area of impact on each vehicle; location of the vehicle collision or whether the vehicle collision occurred on private property or not; an amount or severity of human injuries; and/or a make, model, and age of the vehicles. Processor analysis or machine learning techniques may then use the foregoing as additional inputs and determine the likelihood that a particular vehicle will be deemed a total loss for insurance purposes.

Additional Considerations

With the foregoing, an indication of whether a vehicle in a crash is a total loss may be determined based upon various data and/or factors that facilitate accurate determination of such an indication without the need for inspection, assessment, etc. of the vehicle by an insurance agent or other representative. Accordingly, a time to dispose of or repair the damaged vehicle may be reduced, associated costs may be reduced, and the costs and resources associated with having an insurance agent or other representative assess or inspect the vehicle may be eliminated.

As such, the systems and methods described herein are directed to an improvement(s) to computer functionality, and improve the functioning of conventional computers. For instance, the systems and methods described and claimed herein are directed to improvements that include improvements in the functioning of a computer or computer system in determining whether a vehicle is a total loss by, among other features, advantageous use of the above-described data and/or factors that are associated with a vehicle collision in determining an indication of whether the vehicle is a total loss, without the need for an inspection, assessment, etc. of the vehicle.

Although the disclosure provides several examples in terms of types of data and/or factors that may be used in determining an indication of whether a vehicle in a crash is a total loss, aspects include any suitable type(s) and number of data, factors, etc., including telematics data. The data discussed herein, including mobile device sensor data, vehicle sensor data, vehicle telematics, etc., may be collected and analyzed by a remote server (e.g., insurance provider server 126) with customer permission or affirmative consent, such as after the customer opts-in into a rewards or other customer loyalty program.

Although the foregoing text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

The following considerations also apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated.

Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations.

A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors, and/or processor-implemented modules, may be located in a single location (e.g., within a home environment, an office environment or as a server farm), while in other embodiments the processor(s) and/or processor-implemented modules may be distributed across a number of locations.

The patent claims at the end of this patent application are not intended to be construed under 35 U.S.C. § 112(f) unless traditional means-plus-function language is expressly recited, such as "means for" or "step for" language being explicitly recited in the claim(s).

This detailed description is to be construed as exemplary only and does not describe every possible embodiment, as describing every possible embodiment would be impracti-

What is claimed:

1. A computer-implemented method of determining an indication of whether a vehicle in a crash is a total loss, the method comprising:
in a first instance:
receiving, by one or more processors, geolocation data, image data re presenting at least one image of an exterior of a vehicle, the vehicle having been in a crash, the image data being image data captured after the crash, and at least one of (i) sensor data associated with the crash, the sensor data including acceleration data associated with the crash or (ii) data indicative of a direction of a crash force exerted upon the vehicle during the crash;
determining, based at least upon the at least one of (i) the sensor data or (ii) the data indicative of the direction of the crash force, to analyze whether the vehicle is a total loss using a total loss machine learning algorithm;
determining, by the one or more processors, an indication of population density in an area in which the crash occurred using a population machine learning algorithm and based upon at least the geolocation data;
determining, by the one or more processors, that the image data should be analyzed using object recognition techniques;
determining, by the one or more processors and using the image machine learning algorithm that utilizes object recognition techniques, at least one of (i) a make of the vehicle, (ii) a model of the vehicle, or (iii) a year of the vehicle based at least upon the image data in response to determining that the image data should be analyzed using object recognition techniques; and
determining, by the one or more processors and using the total loss machine learning algorithm, the indication of whether the vehicle is a total loss as a result of the crash based upon (i) the at least one of (a) the sensor data associated with the crash or (b) the data indicative of the direction of the crash force exerted upon the vehicle during the crash, (ii) the indication of population density in the area in which the crash occurred, and (iii) the at least one of (a) the make of the vehicle, (b) the model of the vehicle, or (c) the year of the vehicle;
wherein the total loss machine learning algorithm is trained, by the one or more processors and using at least depersonalized historical claim data, to determine whether the vehicle is a total loss; and
in a second instance:
receiving, by one or more processors, second geolocation data and second image data representing at least one second image of a second exterior of a second vehicle, the second vehicle having been in a second crash, the second image data being image data captured after the second crash;
determining, based at least upon one of (i) an indication that one or more sensors associated with the second vehicle are not operative or (ii) an indication that a second direction of a second crash force exerted upon the second vehicle cannot be retrieved, to transmit data associated with the second crash to a user; and
transmitting the data associated with the second crash to the user.

2. The computer-implemented method of claim 1, further comprising determining, by the one or more processors, at least one characteristic of a frame of the vehicle based upon at least one of the image data or stored data regarding the vehicle, wherein determining the indication of whether the vehicle is a total loss is further based upon the at least one characteristic of the frame of the vehicle.

3. The computer-implemented method of claim 2, further comprising determining, by the one or more processors based upon data regarding vehicle crashes, that the at least one characteristic of the frame of the vehicle corresponds to one of (i) an increased likelihood that the vehicle is a total loss as a result of the crash, or (ii) a decreased likelihood that the vehicle is a total loss as a result of the crash.

4. The computer-implemented method of claim 1, further comprising determining, by the one or more processors, whether at least one component of the vehicle is to be salvaged based upon at least one of the image data, the type of the geographic area in which the crash occurred, the sensor data associated with the crash, the data indicative of the direction of the crash force exerted upon the vehicle during the crash, the make of the vehicle, the model of the vehicle, or the year of the vehicle.

5. The computer-implemented method of claim 1, further comprising determining, by the one or more processors based upon the determined type of the geographic area in which the crash occurred, an indication of an amount of expense associated with repairing the vehicle in the geographic area after the crash, wherein determining the indication of whether the vehicle is a total loss is further based upon the indication of the amount of the expense associated with repairing the vehicle in the geographic area after the crash.

6. The computer-implemented method of claim 1, wherein receiving the data indicative of the direction of the crash force exerted upon the vehicle during the crash includes receiving, by the one or more processors, at least one of (i) the image data, (ii) the sensor data associated with the crash, (iii) an indication of a Delta-V associated with the crash, (iv) a characteristic of the vehicle, (v) an indication of whether the crash occurred on private property, (vi) an indication of an area of the vehicle impacted during the crash, (vii) an indication of an amount of crush experienced by another vehicle involved in the crash with the vehicle, or (viii) additional sensor data from the other vehicle involved in the crash with the vehicle, the method further comprising determining, by the one or more processors, an indication of the direction of the crash force exerted upon the vehicle during the crash based upon the data indicative of the direction of the crash force exerted upon the vehicle during the crash.

7. The computer-implemented method of claim 6, wherein receiving the data indicative of the direction of the crash force exerted upon the vehicle during the crash includes receiving, by the one or more processors, at least one of (i) the sensor data associated with the crash, or (ii) the additional sensor data from the other vehicle involved in the crash with the vehicle.

8. A computer system configured to determine an indication of whether a vehicle in a crash is a total loss, the computer system comprising at least one of (i) one or more processors, (ii) one or more servers, (iii) one or more sensors, or (iv) one or more transceivers, the computer system configured to:
receive geolocation data, image data representing at least one image of an exterior of the vehicle, the vehicle having been in the crash, the image data being image data captured after the crash, and at least one of (i) sensor data associated with the crash, the sensor data including acceleration data associated with the crash, (ii) data indicative of a direction of a crash force exerted upon the vehicle during the crash (iii) an indication that the one or more sensors are not operative, or (iv) an indication that the direction of the crash force exerted upon the vehicle cannot be retrieved;

determine, based at least upon responsive to receiving at least one of (i) the sensor data or (ii) the data indicative of the direction of the crash force, (iii) an indication that the one or more sensors are not operative, or (iv) an indication that the direction of the crash force exerted upon the vehicle cannot be retrieved, whether to analyze whether the vehicle is a total loss using a total loss machine learning algorithm, determine, responsive to receiving at least one of (iii) the indication that the one or more sensors are not operative or (iv) the indication that the direction of the crash force exerted upon the vehicle cannot be retrieved, to transmit data associated with the crash to a user;

responsive to determining to transmit the data associated with the crash to the user, transmit the data associated with the crash to the user; and responsive to determining to analyze whether the vehicle is a total loss using the total loss machine learning algorithm:

determine an indication of population density in an area in which the crash occurred using a population machine learning algorithm and based upon at least the geolocation data;

determine that the image data should be analyzed using object recognition techniques;

determine, using an image machine learning algorithm that utilizes object recognition techniques, at least one of (i) a make of the vehicle, (ii) a model of the vehicle, or (iii) a year of the vehicle based at least upon the image data in response to determining that the image data should be analyzed using object recognition techniques; and determine, using a total loss machine learning algorithm, the indication of whether the vehicle is a total loss as a result of the crash based upon (i) the at least one of (a) the sensor data associated with the crash or (b) the data indicative of the direction of the crash force exerted upon the vehicle during the crash, (ii) the indication of population density in the area in which the crash occurred, and (iii) the at least one of (a) the make of the vehicle, (b) the model of the vehicle, or (c) the year of the vehicle;

wherein the total loss machine learning algorithm is trained, by the one or more processors and using at least depersonalized historical claim data, to determine whether the vehicle is a total loss.

9. The computer system of claim 8, the computer system further configured to:

determine at least one characteristic of a frame of the vehicle based upon at least one of the image data or stored data regarding the vehicle; and determine the indication of whether the vehicle is a total loss further based upon the at least one characteristic of the frame of the vehicle.

10. The computer system of claim 9, the computer system further configured to determine, based upon data regarding vehicle crashes, that the at least one characteristic of the frame of the vehicle corresponds to one of (i) an increased likelihood that the vehicle is a total loss as a result of the crash, or (ii) a decreased likelihood that the vehicle is a total loss as a result of the crash.

11. The computer system of claim 8, the computer system further configured to determine whether at least one component of the vehicle is to be salvaged based upon at least one of the image data, the type of the geographic area in which the crash occurred, the sensor data associated with the crash, the data indicative of the direction of the crash force exerted upon the vehicle during the crash, the make of the vehicle, the model of the vehicle, or the year of the vehicle.

12. The computer system of claim 8, the computer system further configured to:

determine, based upon the determined type of the geographic area in which the crash occurred, an indication of an amount of expense associated with repairing the vehicle in the geographic area after the crash; and determine the indication of whether the vehicle is a total loss further based upon the indication of the amount of the expense associated with repairing the vehicle in the geographic area after the crash.

13. The computer system of claim 8, the computer system further configured to:

receive the data indicative of the direction of the crash force exerted upon the vehicle during the crash by receiving at least one of (i) the image data, (ii) the sensor data associated with the crash, (iii) an indication of a Delta-V associated with the crash, (iv) a characteristic of the vehicle, (v) an indication of whether the crash occurred on private property, (vi) an indication of an area of the vehicle impacted during the crash, (vii) an indication of an amount of crush experienced by another vehicle involved in the crash with the vehicle, or (viii) additional sensor data from the other vehicle involved in the crash with the vehicle; and determine an indication of the direction of the crash force exerted upon the vehicle during the crash based upon the data indicative of the direction of the crash force exerted upon the vehicle during the crash.

14. A system of determining an indication of whether a vehicle in a crash is a total loss, the system comprising:

one or more insurance provider computing devices associated with an insurance provider, the one or more insurance provider computing devices configured to:

receive geolocation data, image data representing at least one image of an exterior of the vehicle, the vehicle having been in the crash, the image data being image data captured after the crash, and at least one of (i) sensor data associated with the crash, the sensor data including acceleration data associated with the crash, (ii) data indicative of a direction of a crash force exerted upon the vehicle during the crash, (iii) an indication that the one or more sensors are not operative, or (iv) an indication that the direction of the crash force exerted upon the vehicle cannot be retrieved;

determine, based at least upon responsive to receiving at least one of (i) the sensor data or (ii) the data indicative of the direction of the crash force, (iii) an indication that the one or more sensors are not operative, or (iv) an indication that the direction of the crash force exerted upon the vehicle cannot be retrieved, whether to analyze whether the vehicle is a total loss using a total loss machine learning algorithm, determine, responsive to receiving at least one of (iii) the indication that the one or more sensors are not operative or (iv) the indication that the direction of the crash force exerted upon the vehicle cannot be retrieved, to transmit data associated with the crash to a user;

responsive to determining to transmit the data associated with the crash to the user, transmit the data associated with the crash to the user; and responsive to determining to analyze whether the vehicle is a total loss using the total loss machine learning algorithm:

determine an indication of population density in an area in which the crash occurred using a population machine learning algorithm and based at least upon the geolocation data;

determine that the image data should be analyzed using object recognition techniques;

determine, using an image machine learning algorithm that utilizes object recognition techniques, at least one of (i) a make of the vehicle, (ii) a model of the vehicle, or (iii) a year of the vehicle based at least upon the image data in response to determining that the image data should be analyzed using object recognition techniques; and determine, using a total loss machine learning algorithm, the indication of whether the vehicle is a total loss as a result of the crash based upon (i) the at least one of (a) the sensor data associated with the crash or (b) the data indicative of the direction of the crash force exerted upon the vehicle during the crash, (ii) the indication of population density in the area in which the crash occurred, and (iii) the at least one of (a) the make of the vehicle, (b) the model of the vehicle, or (c) the year of the vehicle;

wherein the total loss machine learning algorithm is trained, by the one or more processors and using at least depersonalized historical claim data, to determine whether the vehicle is a total loss.

15. The system of claim 14, further comprising an image capturing device configured to capture the image data after the crash, wherein the one or more insurance provider computing devices are further configured to:

determine at least one characteristic of a frame of the vehicle based upon at least one of the image data or stored data regarding the vehicle; and determine the indication of whether the vehicle is a total loss further based upon the at least one characteristic of the frame of the vehicle.

16. The system of claim 15, wherein the one or more insurance provider computing devices are further configured to determine, based upon data regarding vehicle crashes, that the at least one characteristic of the frame of the vehicle corresponds to one of (i) an increased likelihood that the vehicle is a total loss as a result of the crash, or (ii) a decreased likelihood that the vehicle is a total loss as a result of the crash.

17. The system of claim 14, wherein the one or more insurance provider computing devices are further configured to determine whether at least one component of the vehicle is to be salvaged based upon at least one of the image data, the type of the geographic area in which the crash occurred, the sensor data associated with the crash, the data indicative of the direction of the crash force exerted upon the vehicle during the crash, the make of the vehicle, the model of the vehicle, or the year of the vehicle.

18. The system of claim 14, wherein the one or more insurance provider computing devices are further configured to:

determine, based upon the determined type of the geographic area in which the crash occurred, an indication of an amount of expense associated with repairing the vehicle in the geographic area after the crash; and determine the indication of whether the vehicle is a total loss further based upon the indication of the amount of the expense associated with repairing the vehicle in the geographic area after the crash.

19. The system of claim 14, further comprising one or more sensors associated with the vehicle, wherein the one or more sensors are configured to generate the sensor data associated with the crash, wherein the one or more insurance provider computing devices are further configured to:

receive the data indicative of the direction of the crash force exerted upon the vehicle during the crash by receiving at least one of (i) the image data, (ii) the sensor data associated with the crash, (iii) an indication of a Delta-V associated with the crash, (iv) a characteristic of the vehicle, (v) an indication of whether the crash occurred on private property, (vi) an indication of an area of the vehicle impacted during the crash, (vii) an indication of an amount of crush experienced by another vehicle involved in the crash with the vehicle, or (viii) additional sensor data from the other vehicle involved in the crash with the vehicle; and determine an indication of the direction of the crash force exerted upon the vehicle during the crash based upon the data indicative of the direction of the crash force exerted upon the vehicle during the crash.

20. The system of claim 19, further comprising one or more additional sensors associated with the other vehicle involved in the crash with the vehicle, wherein the one or more additional sensors are configured to generate the additional sensor data from the other vehicle involved in the crash with the vehicle, and wherein the one or more insurance provider computing devices are further configured to at least one of (i) receive the sensor data associated with the crash from the one or more sensors, or (ii) receive the additional sensor data from the one or more additional sensors associated with the other vehicle involved in the crash with the vehicle.

* * * * *